(12) United States Patent
Wakatsuki

(10) Patent No.: US 10,081,218 B2
(45) Date of Patent: Sep. 25, 2018

(54) WHEEL BEARING APPARATUS

(71) Applicant: NTN Corporation, Osaka-shi (JP)

(72) Inventor: Atsushi Wakatsuki, Iwata (JP)

(73) Assignee: NTN Corporation, Osaka-shi (JP)

( * ) Notice: Subject to any disclaimer, the term of this patent is extended or adjusted under 35 U.S.C. 154(b) by 235 days.

(21) Appl. No.: 14/865,043

(22) Filed: Sep. 25, 2015

(65) Prior Publication Data

US 2016/0009128 A1    Jan. 14, 2016

Related U.S. Application Data

(63) Continuation of application No. PCT/JP2014/058905, filed on Mar. 27, 2014.

(30) Foreign Application Priority Data

Mar. 27, 2013 (JP) .................. 2013-067578
Apr. 3, 2013 (JP) .................. 2013-077865

(51) Int. Cl.
*F16C 33/72* (2006.01)
*B60B 27/00* (2006.01)
(Continued)

(52) U.S. Cl.
CPC ........ *B60B 27/0068* (2013.01); *B60B 7/0013* (2013.01); *B60B 27/0005* (2013.01);
(Continued)

(58) Field of Classification Search
CPC ...... F16C 35/04; F16C 33/723; F16C 33/783; F16C 33/583; B60B 27/0068;
(Continued)

(56) References Cited

U.S. PATENT DOCUMENTS 5,217,137 A * 6/1993 Andrews ............. B60B 27/0005
220/366.1
6,155,573 A * 12/2000 Simms .................. B60B 35/121
277/373
(Continued)

FOREIGN PATENT DOCUMENTS

CN 202165608 3/2012
EP 1 956 274 8/2008
(Continued)

*Primary Examiner* — Alan B Waits
(74) *Attorney, Agent, or Firm* — Harness, Dickey & Pierce, P.L.C.

(57) ABSTRACT

A wheel bearing apparatus has an outer member, an inner member and double row rolling elements contained between the outer member and the inner member. A first cap is press-fit into an inboard-side opening of the outer member. The first cap has a cylindrical fitting portion press-fit into an inside fitting surface of the outer member. A bottom portion extends radially inward from the fitting portion to cover the inboard-side end of the inner member. An elastic member is integrally adhered onto an inboard-side outer circumference of the fitting portion of the first cap. The elastic member projects radially outward beyond the outer diameter of the fitting portion. A retracted surface is formed on an inboard-side from the inside fitting surface, via a step portion. The retracted surface has a larger diameter than that of the inside fitting surface. The elastic member press-contacts against the retracted surface while being elastically deformed.

16 Claims, 14 Drawing Sheets

(51) Int. Cl.
*F16C 19/18* (2006.01)
*G01P 3/487* (2006.01)
*G01P 3/44* (2006.01)
*F16C 33/76* (2006.01)
*F16C 33/78* (2006.01)
*F16C 41/00* (2006.01)
*F16C 33/58* (2006.01)
*B60B 7/00* (2006.01)

(52) U.S. Cl.
CPC ........ *B60B 27/0094* (2013.01); *F16C 33/583* (2013.01); *F16C 33/723* (2013.01); *F16C 33/768* (2013.01); *F16C 33/783* (2013.01); *F16C 33/7869* (2013.01); *F16C 41/007* (2013.01); *G01P 3/443* (2013.01); *G01P 3/487* (2013.01); *B60B 27/0073* (2013.01); *F16C 19/186* (2013.01); *F16C 2326/02* (2013.01)

(58) Field of Classification Search
CPC ... B60B 27/0073; B60B 7/0013; G01P 3/487; G01P 3/443
See application file for complete search history.

(56) References Cited

U.S. PATENT DOCUMENTS

| | | | | |
|---|---|---|---|---|
| 6,715,926 B2* | 4/2004 | Tajima | ............ | B60B 27/00 384/544 |
| 6,997,615 B2* | 2/2006 | Takada | ............ | B60B 27/0005 384/448 |
| 7,758,249 B2* | 7/2010 | Shimizuya | ............ | F16C 19/186 384/484 |
| 8,449,197 B2* | 5/2013 | Kawamura | ............ | B60B 27/00 301/105.1 |
| 2011/0181101 A1* | 7/2011 | Sicilia | ............ | B60B 7/0013 301/108.1 |
| 2011/0182540 A1* | 7/2011 | Terazawa | ............ | F16C 33/723 384/489 |
| 2011/0254356 A1* | 10/2011 | Yamamoto | ............ | B60B 27/0005 301/109 |

FOREIGN PATENT DOCUMENTS

| | | |
|---|---|---|
| JP | 04-175580 | 6/1992 |
| JP | 2004-052831 | 2/2004 |
| JP | 2005-249180 | 9/2005 |
| JP | 2007-309389 | 11/2007 |
| JP | 2008-196553 | 8/2008 |
| JP | 2010-071456 | 4/2010 |
| JP | 2010-125866 | 6/2010 |
| JP | 2011-117583 | 6/2011 |
| JP | 2011-196425 | 10/2011 |
| JP | 2012-106547 | 6/2012 |
| JP | 2013-028248 | 2/2013 |
| WO | WO2009/084355 | 7/2009 |
| WO | WO2010/050201 | 5/2010 |
| WO | WO2011/034134 | 3/2011 |

* cited by examiner

[Fig 1]
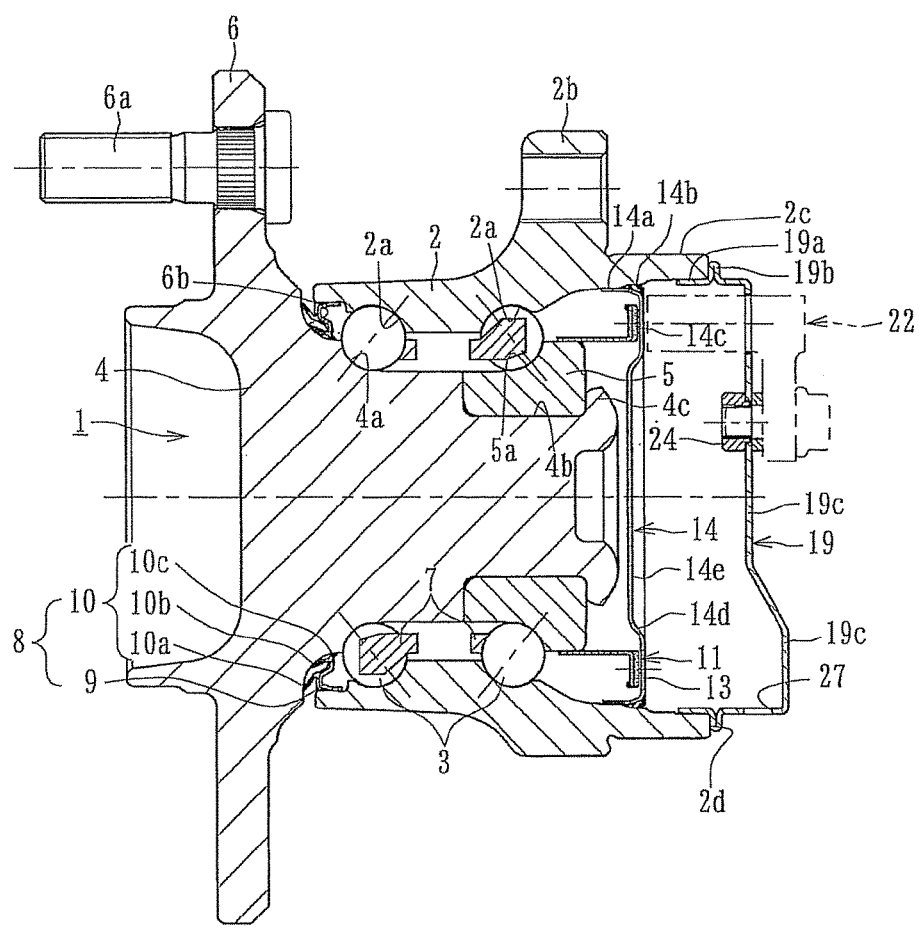

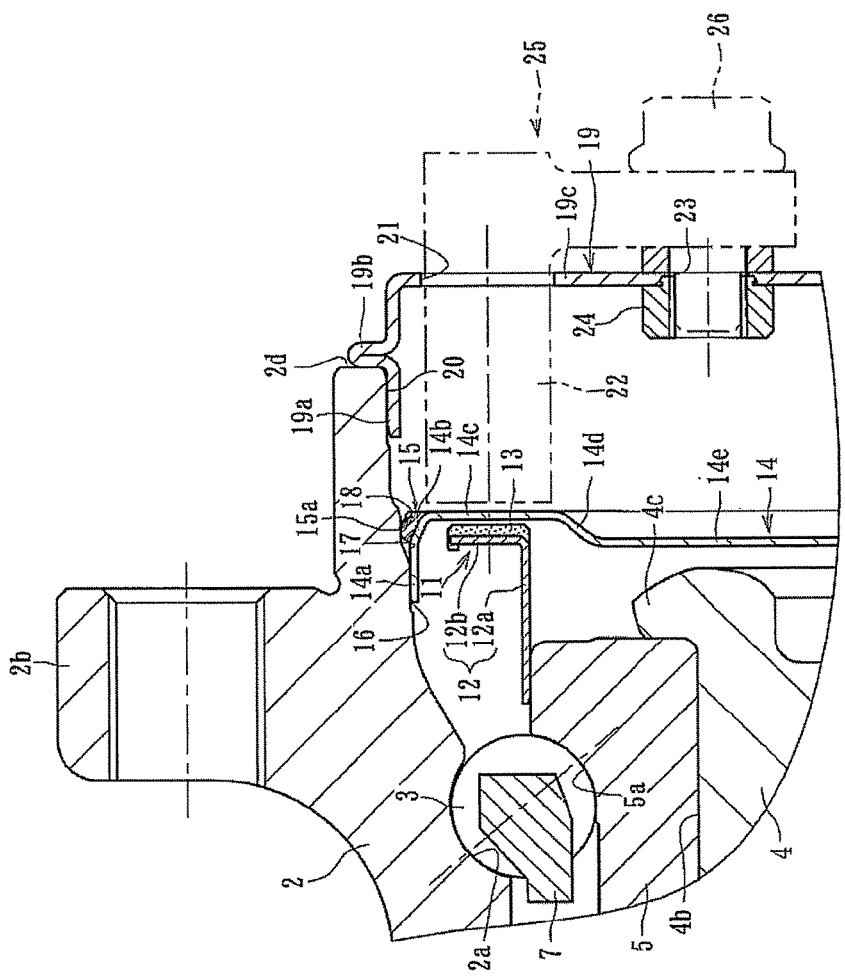
[Fig 2]

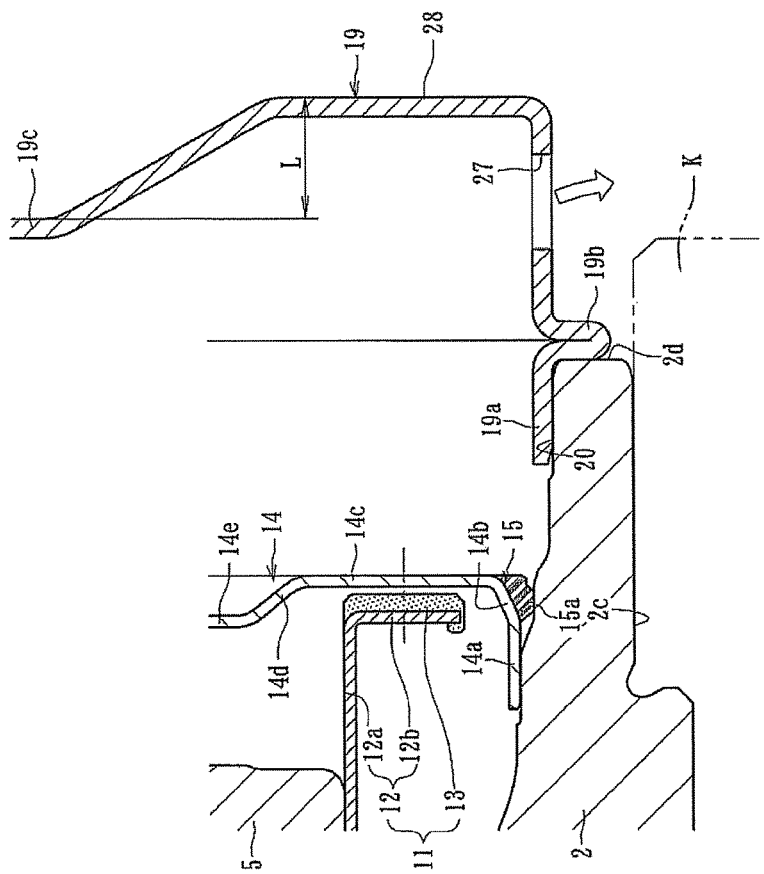

[Fig 4]
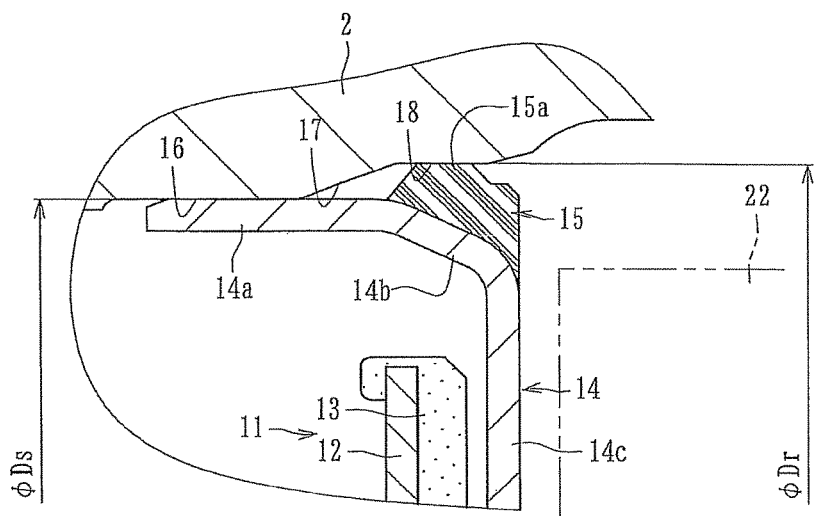
[Fig 5]
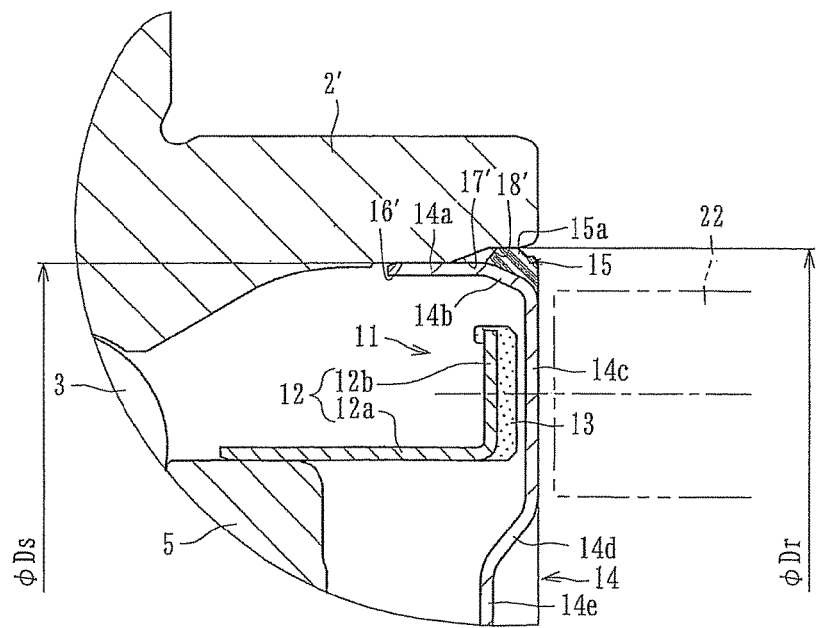

[Fig 6]
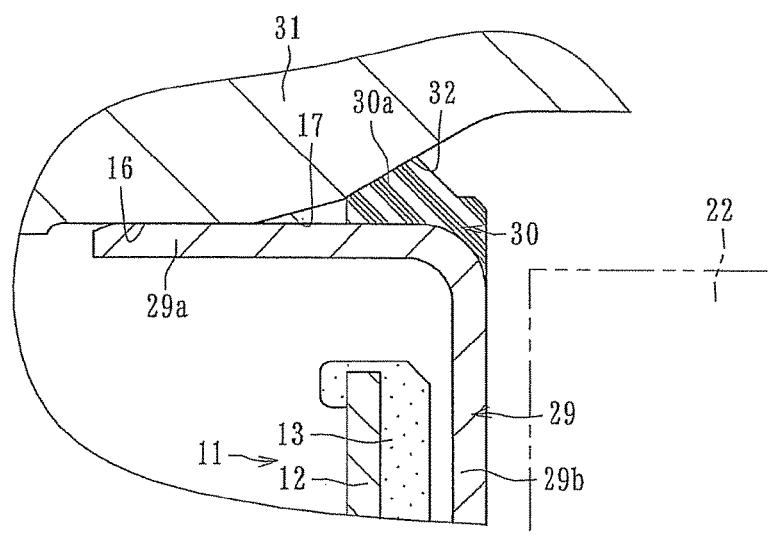
[Fig 7]
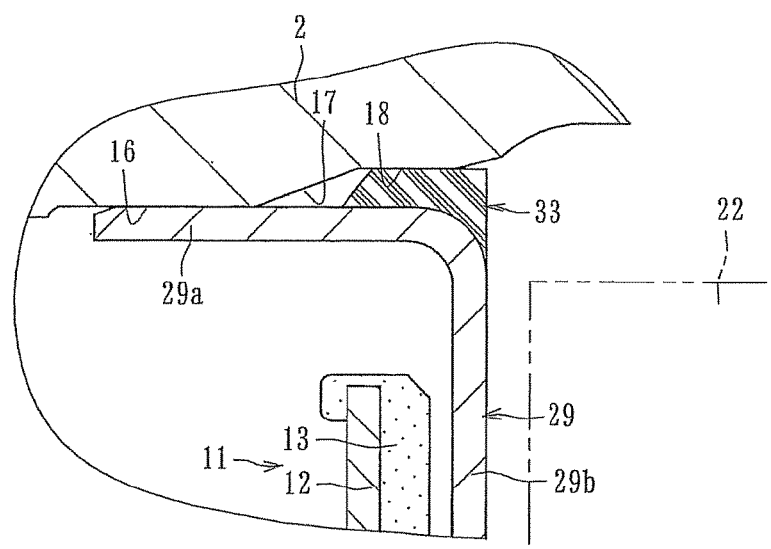

[Fig 8]
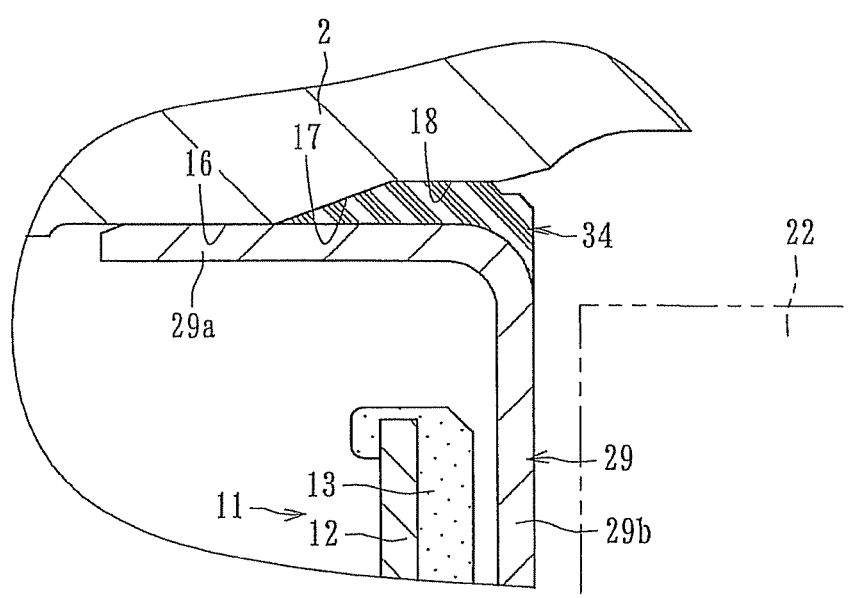

[Fig 9]
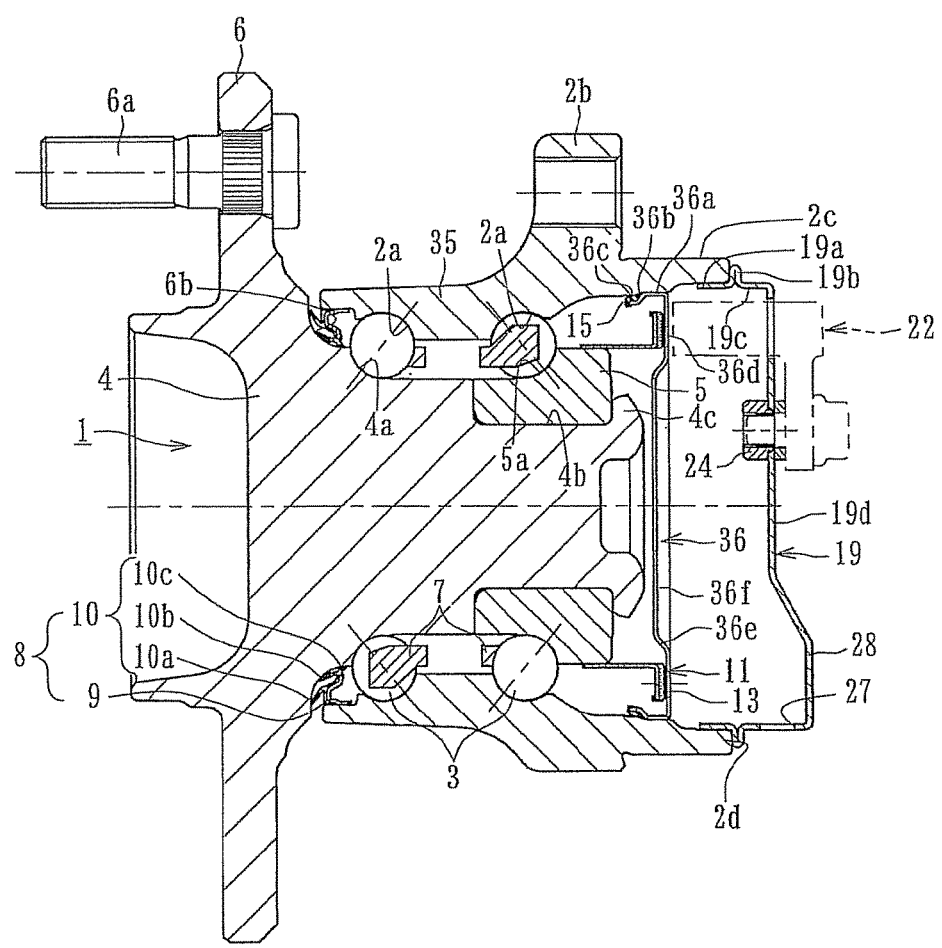

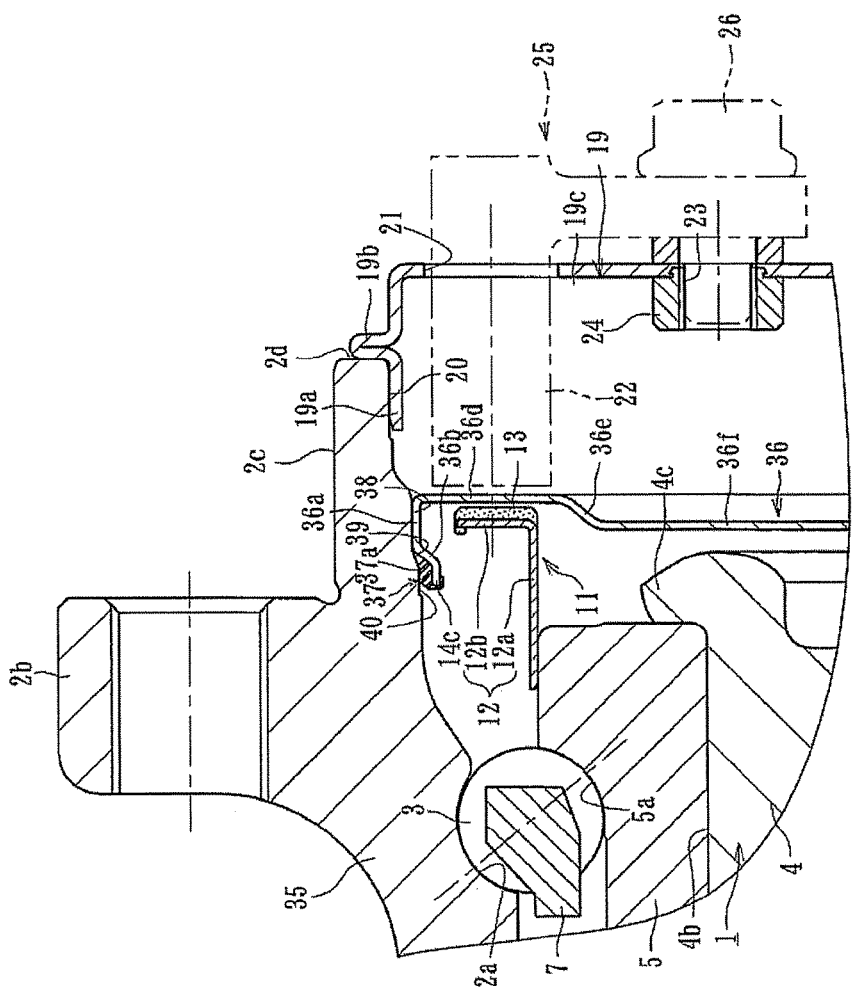
[Fig 10]

[Fig 11]
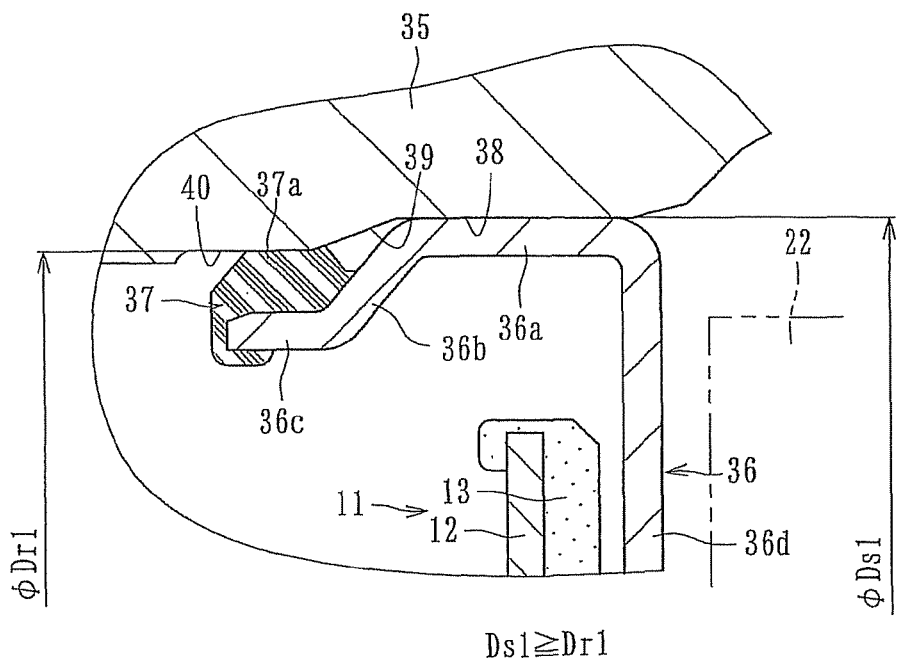
Ds1≧Dr1
[Fig 12]
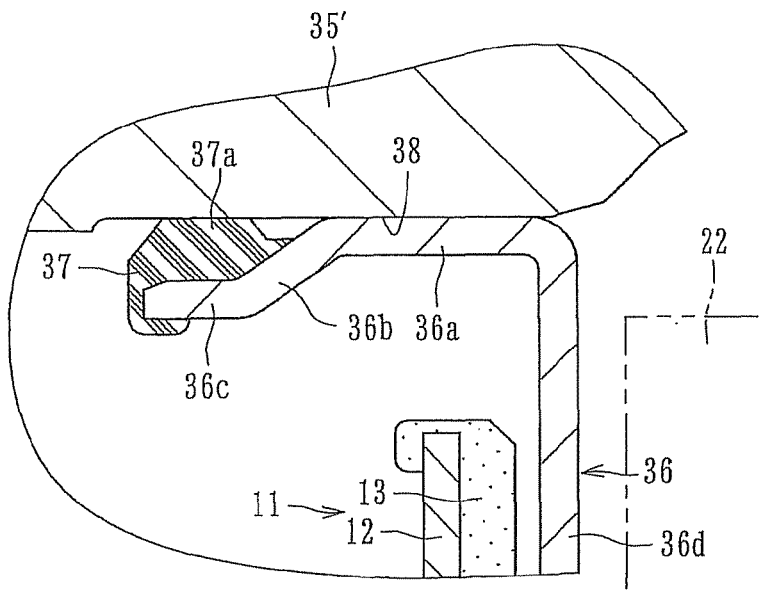

[Fig 13]
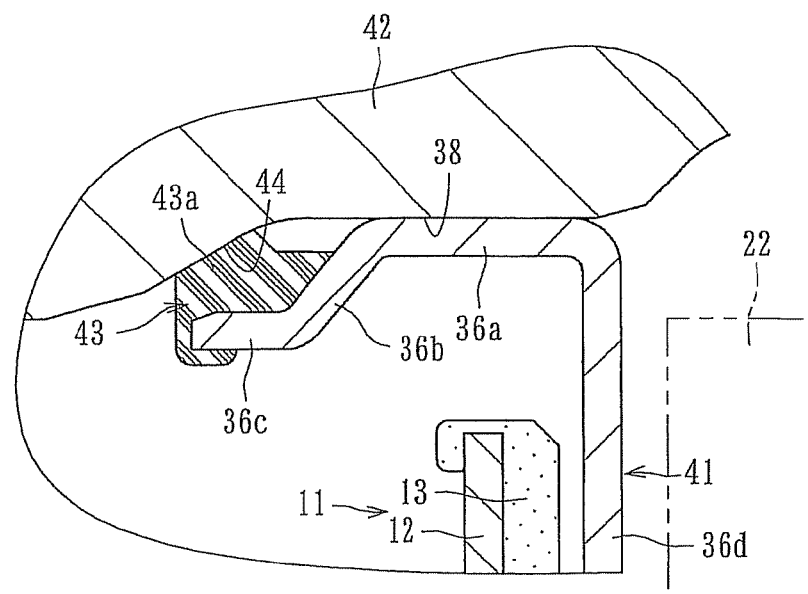
[Fig 14]
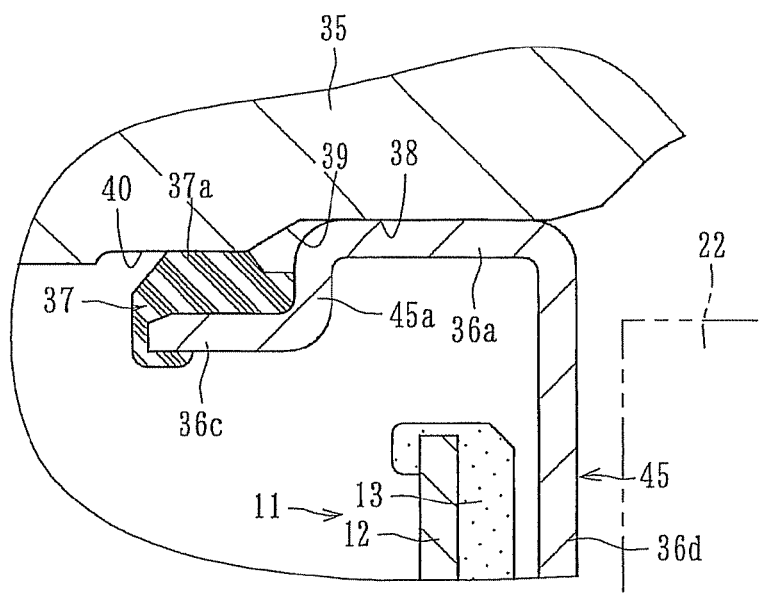

[ Fig 15 ]
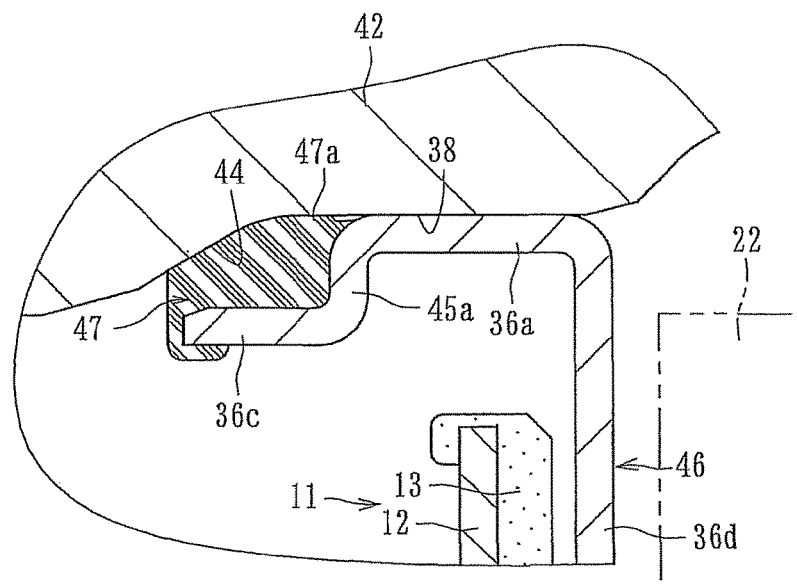
[ Fig 16 ]
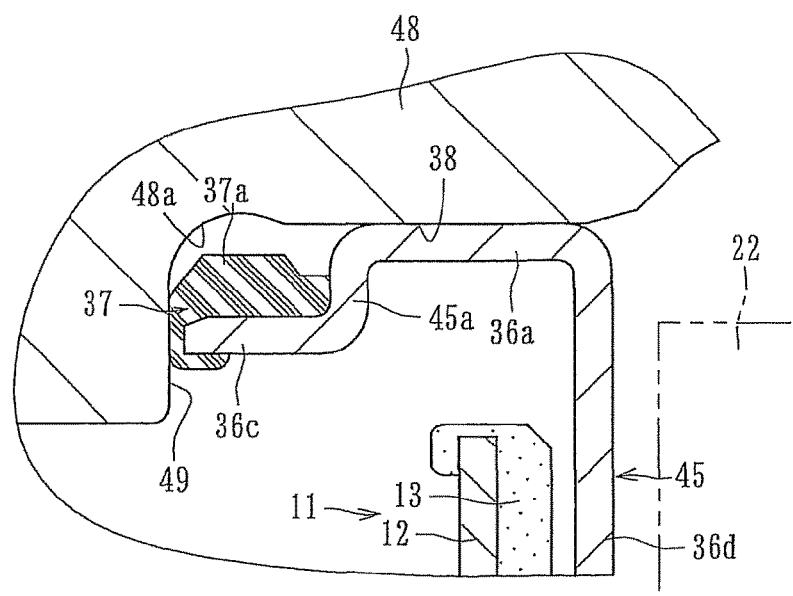

[Fig 17]
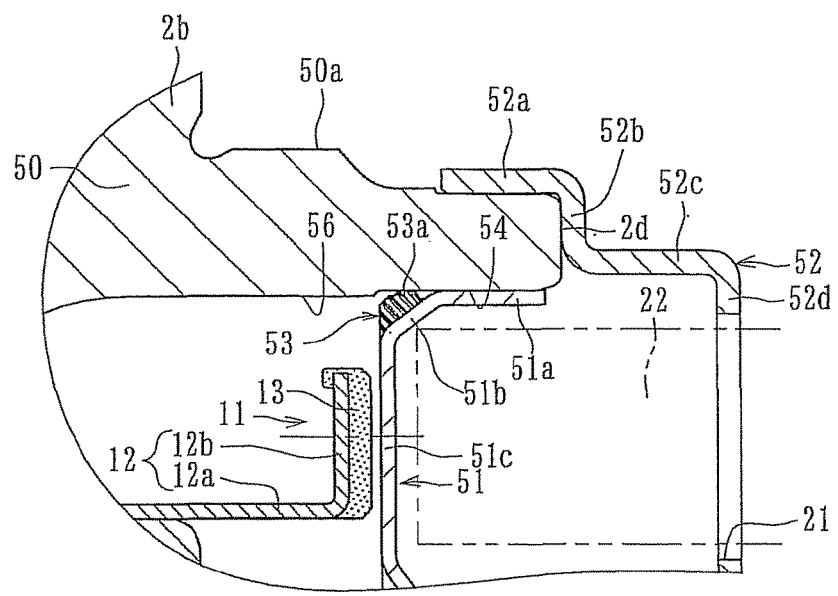
[Fig 18]
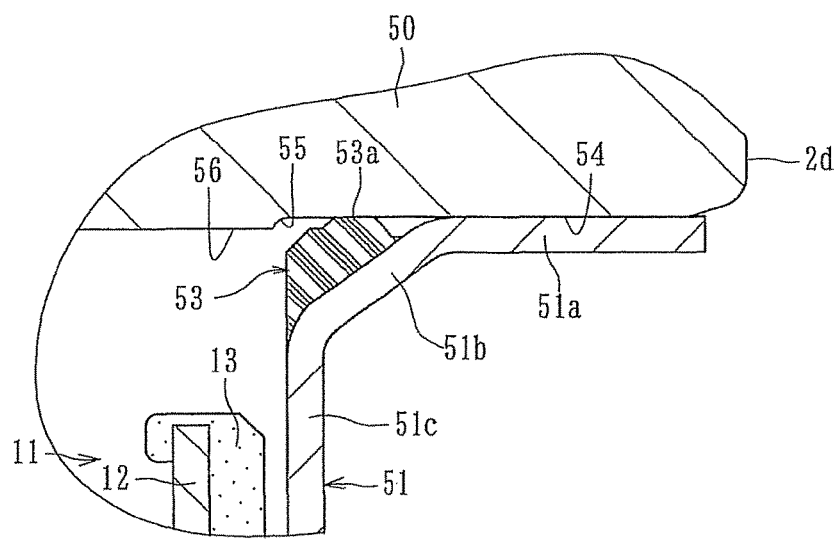

[Fig 19]
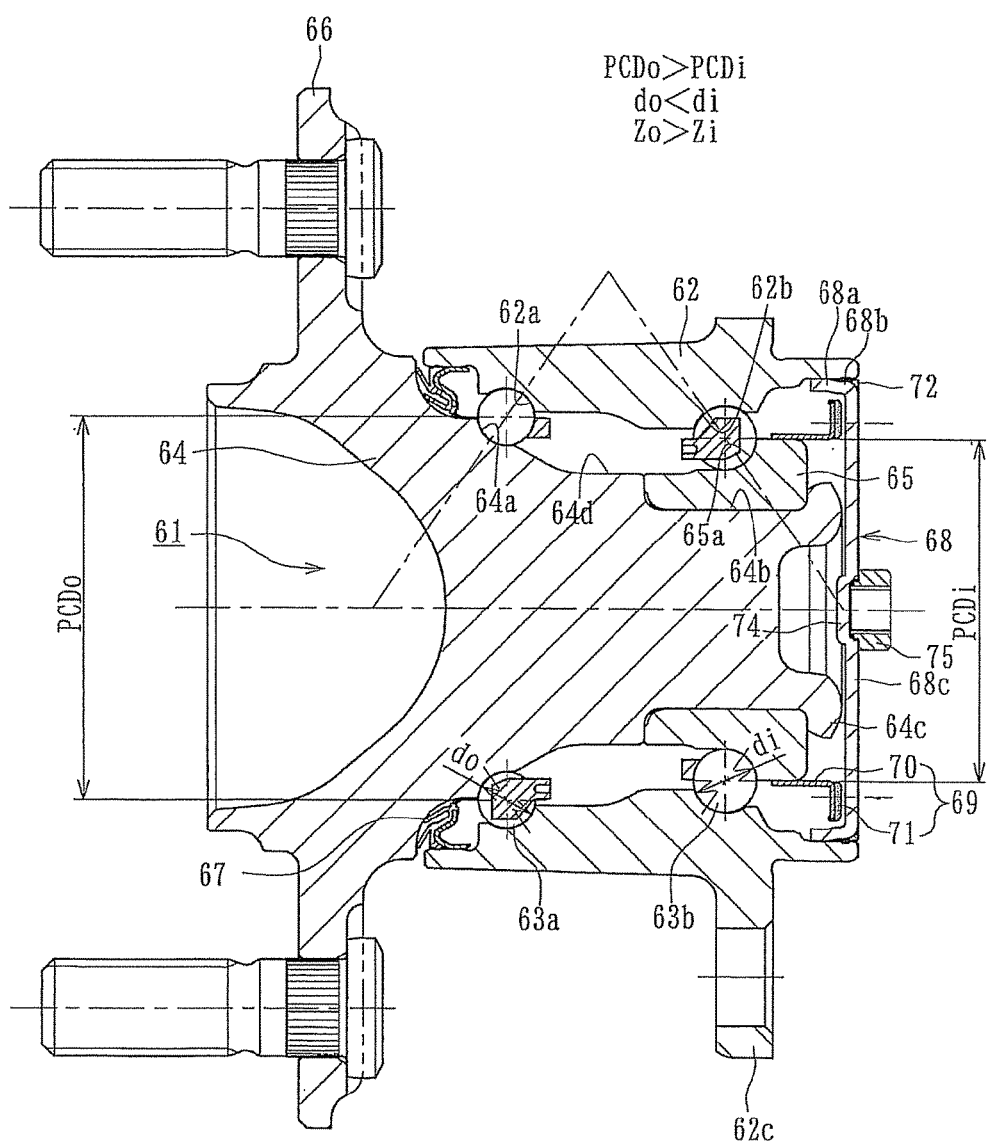

[Fig 20]
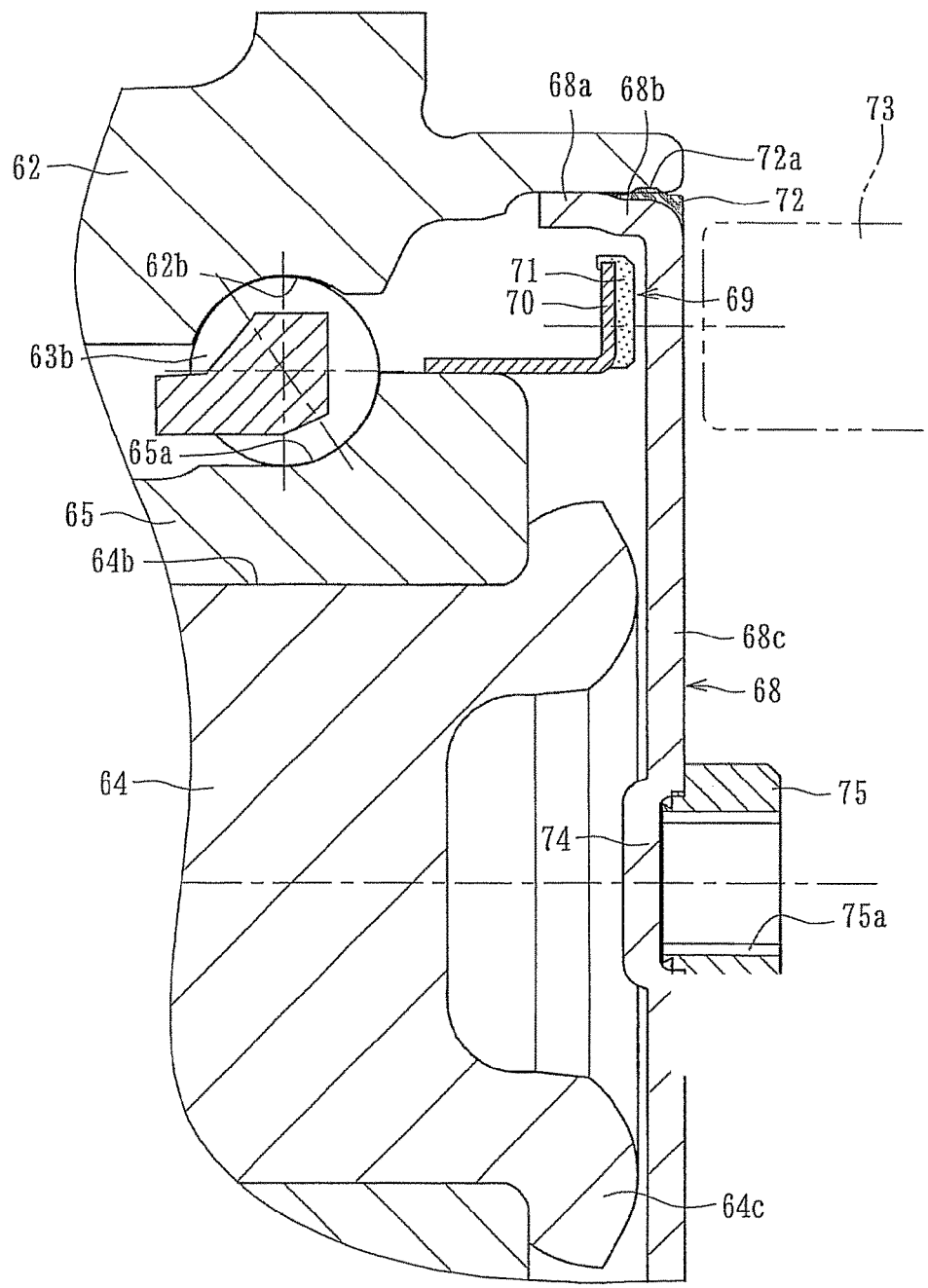

WHEEL BEARING APPARATUS

CROSS-REFERENCE TO RELATED APPLICATIONS

This application is a continuation of International Application No. PCT/JP2014/058905, filed Mar. 27, 2014, which claims priority to Japanese Application Nos. 2013-067578, filed Mar. 27, 2013 and 2013-077865, filed Apr. 3, 2013. The disclosures of the above applications are incorporating herein by reference.

FIELD

The present disclosure generally relates to a wheel bearing apparatus that rotationally supports a vehicle wheel, such as an automobile, with respect to a suspension apparatus and, more particularly, to a wheel bearing apparatus with a rotational speed sensor to detect rotational speed of the vehicle wheel.

BACKGROUND

Wheel bearing apparatus is generally known that supports a vehicle wheel with respect to a suspension apparatus and detects rotational speed of a vehicle wheel to control the anti-lock braking system (ABS). Such a bearing apparatus usually includes a sealing apparatus arranged between inner and outer members. The inner and outer members rotate relatively to each other via rolling elements contained between them. The rotational speed detecting apparatus has a magnetic encoder with alternately arranged magnetic poles along its circumference. The magnetic encoder is integrally formed with the sealing apparatus. A rotational speed sensor detects change of magnetic poles of the magnetic encoder caused by rotation of the wheel.

In general, the rotational speed sensor is mounted on a knuckle, forming part of a suspension apparatus, after the wheel bearing apparatus has been mounted on the knuckle. However, a wheel bearing apparatus has been recently proposed where the rotational speed sensor is adapted to be mounted on the wheel bearing apparatus in order to reduce the entire size of the wheel bearing apparatus. This eliminates the complexity of the adjustment of an air gap between the rotational speed sensor and the magnetic encoder.

FIG. 19 is one example of a wheel bearing apparatus. The wheel bearing apparatus includes an inner member 61, an outer member 62 and double row balls 63a, 63b rollably contained between the inner and outer members 61, 62. The inner member 61 has a wheel hub 64 and an inner ring 65 press-fit onto the wheel hub 64, via a predetermined interference.

The wheel hub 64 has a wheel mounting flange 66 on its one end. One inner raceway surface 64a is formed on the outer circumference of the wheel hub 64. A cylindrical portion 64b axially extends from the inner raceway surface 64a, via a shaft portion 64d.

The inner ring 65 includes the other inner raceway surface 65a on its outer circumference. The inner ring 65 is press-fit onto the cylindrical portion 64b of the wheel hub 64. The inner ring 65 is axially immovably secured by a caulked portion 64c formed by plastically deforming the end of the cylindrical portion 64b.

The outer member 62 includes a body mounting flange 62c on its outer circumference. The outer member 62 inner circumference includes outer raceway surfaces 62a, 62b. The outer raceway surface 62a opposes the inner raceway surface 64a of the wheel hub 64. The outer raceway surface 62b opposes the inner raceway surface 65a of the inner ring 65. A seal 67 and a sensor cap 68 are mounted in annular openings formed between the inner and outer members 61, 62. The seal 67 and sensor cap 68 prevent leakage of lubricating grease, sealed within the bearing, and the entry of rain water or dust from the outside into the bearing.

The pitch circle diameter PCDo of the outboard-side row balls 63a is set larger than the pitch circle diameter PCDi balls 63b of the inboard-side row balls 63a (PCDo>PCDi). The ball diameter (do) of the outboard-side balls 63a is set smaller than the ball diameter (di) of the inboard-side balls 63a (do<di). In addition, the number (Zo) of the outboard-side balls 63a is set larger than the number (Zi) of the inboard-side balls 63a (Zo>Zi). This makes it possible to increase the bearing rigidity of the outboard-side as compared with that of the inboard-side. Thus, this increases the bearing life.

As shown in FIG. 20, a pulser ring 69 is press-fit onto the inner ring 65. The pulser ring 69 has a support annulus 70 and a magnetic encoder 71 adhered to one side of the support annulus 70, via vulcanized adhesion.

The sensor cap 68 is press-fit into the inboard-side end of the outer member 62 to close the opening. The sensor cap 68 is press-formed from austenitic stainless steel sheet. The sensor cap 68 has a cup configuration and includes a cylindrical fitting portion 68a that is press-fit into the inner circumference of the inboard-side end of the outer member 62. A bottom portion 68c extends radially inward from the fitting portion 68a, via a radially reduced portion 68b, to cover the end opening of the inner member 61.

An elastic member 72 of synthetic rubber, such as NBR (acrylonitric butadiene rubber), is integrally adhered to the outer circumference of the radially reduced portion 68b of the sensor cap 68. The elastic member 72 is adhered to the sensor cap 68 so that it does not project toward the inboard-side from the side of the bottom portion 68c. This prevents the elastic member 72 from interfering with a rotational speed sensor 73. In addition, the elastic member 72 has an annular projection 72a. The projection 72a projects radially outward beyond the fitting portion 68a of the outer member 62. Thus, it is elastically deformed and press-contacts against the inner circumference of the outer member 62 during the press-fitting of the sensor cap 68. This improves the sealability of the fitting portion 68a.

A circular recess 74 is formed substantially at the center of the bottom portion 68c of the sensor cap 68. A nut 75 is crimped in the circular recess 74. The rotational speed sensor 73 can be secured onto the sensor cap 68. A securing bolt (not shown) is passed into a female thread 75a, via a mounting flange (not shown) of the rotational speed sensor 73. This smoothly secures the rotational speed sensor 73 without deviated torque on the sensor cap 68 during fastening of the securing bolt.

The rotational speed sensor 73 is arranged at a radially outer position of the bottom portion 68c of the sensor cap 68. The sensor 73 opposes the magnetic encoder 71 while abutting against or being closely adjacent the sensor cap 68. The sensor detects wheel rotational speed by detecting variation of the magnetic flux of the magnetic encoder 71. This makes it possible to obtain a desirable air gap. Thus, this improves workability during assembly of the wheel bearing while omitting complex air gap adjustment. Additionally, since the magnetic encoder is closed by the sensor cap 68, it is possible to provide a wheel bearing apparatus integrated with a rotational speed detecting apparatus that can obtain sealability without adversely affecting the detecting performance (see, JP 2011-196425 A).

In prior art wheel bearing apparatus, the sensor cap 68 is integrally formed with the elastic member 72. The elastic member 72 has the annular projection 72a that projects radially outward beyond the outer circumference of the fitting portion 68a of the sensor cap 68. It has an advantage that the annular projection can be elastically deformed and press-contact against the inner circumference of the outer member 62 during fitting of the sensor cap 68. Thus, this improves the sealability of the fitting portion of the sensor cap 68.

However, the prior art wheel bearing apparatus has a disadvantage in that the fitting surface of the outer member 62 receives small linear scratches from the fitting portion 68a of the sensor cap 68 during insertion of the sensor cap 68. Accordingly, the annular projection 72a of the elastic member 72 may be partially damaged during insertion. Thus, the sealability of the fitting portion 68a of the sensor cap 68 would also be impaired.

SUMMARY

It is, therefore, an object of the present disclosure to provide a wheel bearing apparatus that does not cause damage to the elastic member even if linear scratches are formed on the fitting surface of the outer member by the cap during insertion. Thus, this improves the sealability of the fitting portion and the reliability of the wheel bearing apparatus.

To achieve the object mentioned above, a wheel bearing apparatus comprises an outer member, an inner member and double row rolling elements. The outer member outer circumference has an integrally formed body mounting flange to be mounted on a body of a vehicle. The outer member inner circumference has double row outer raceway surfaces. The inner member includes a wheel hub and at least one inner ring. The wheel hub is integrally formed, on its one end, with a wheel mounting flange. A cylindrical portion axially extends from the wheel mounting flange. The inner ring is press-fit onto the cylindrical portion of the wheel hub. The inner member outer circumference has double row inner raceway surfaces opposing the double row outer raceway surfaces. Double row rolling elements are contained between the outer raceway surfaces and inner raceway surfaces, respectively, of the outer member and the inner member. A seal is mounted in an outboard-side opening formed between the outer member and the inner member. A first cap is press-fit into an inboard-side opening of the outer member. The first cap comprises a cylindrical fitting portion press-fit into an inside fitting surface of the outer member. A bottom portion extends radially inward from the fitting portion to cover the inboard-side end of the inner member. The first cap inboard-side outer circumference of the fitting portion is integrally adhered with an elastic member, of synthetic rubber, via vulcanized adhesion. The elastic member projects radially outward beyond the outer diameter of the fitting portion. The inner circumference of the inboard-side end of the outer member is formed with an inside fitting surface. The first cap is press-fit into the inside fitting surface and a retracted surface is formed on the inboard-side spaced from the inside fitting surface via a step portion. The retracted surface has a larger diameter than that of the inside fitting surface. The elastic member is press-contacted against the retracted surface while being elastically deformed.

According to the present disclosure, a seal is mounted in an outboard-side annular opening formed between the outer member and the inner member. A first cap is press-fit into an inboard-side opening of the outer member. The first cap comprises a cylindrical fitting portion press-fit into an inside fitting surface of the outer member. A bottom portion extends radially inward from the fitting portion to cover the inboard-side end of the inner member. An elastic member is integrally adhered on the inboard-side outer circumference of the fitting portion. The elastic member is formed from synthetic rubber and is vulcanized adhered to the first cap. The elastic member projects radially outward beyond the outer diameter of the fitting portion. The inner circumference of the inboard-side end of the outer member is formed with an inside fitting surface that receives the first cap. A retracted surface is formed on the inboard-side spaced from the inside fitting surface via a step portion. The retracted surface has a larger diameter than that of the inside fitting surface. The elastic member press-contacts against the retracted surface while being elastically deformed. Thus, no scratches occur on the retracted surface, due to press-fitting, where the elastic member contacts the outer member even if linear scratch occurs on the fitting surface of the outer member during fitting of the first cap (i.e. sealing cap). Thus, damage to the elastic member is prevented. Accordingly, it is possible to improve the sealability of the fitting portion of the first cap and the reliability of the wheel bearing apparatus.

According to the present disclosure, the inner diameter of the retracted surface is set larger than the maximum value of the tolerance of the inner diameter of the inside fitting surface. Thus, it is possible to prevent scratches occurring, during fitting of the first cap (sealing cap), on the retracted surface where the elastic member press-contacts the outer member.

According to the present disclosure, the retracted surface of the outer member is formed as a tapered surface gradually extending toward the open end. The elastic member has a tapered surface that press-contacts against the retracted surface. The elastic member can be firmly pressed against the tapered surface of the outer member via a wedge effect between the tapered surfaces of the elastic member and the retracted surface of the outer member. Thus, it is possible to further improve the sealability of the fitting portion.

According to the present disclosure, the elastic member press-contacts against both the step portion and retracted surface of the outer member. The elastic member can fill the fitting clearance between the outer member and the first cap (sealing cap). Thus, this improves the sealability of the fitting portion.

According to the present disclosure, a pulser ring, with circumferentially and equidistantly varying magnetic characteristics, is press-fit onto the inner ring. The first cap is formed from non-magnetic steel sheet. A rotational speed sensor opposes the pulser ring via a predetermined axial air gap through the first cap. The rotational speed sensor abuts against or is arranged close to the first cap. Thus, it is possible to set a small air gap without adversely affecting the detecting performance of the rotational speed sensor. Accordingly, this improves the detecting accuracy and sealability of bearing spaces.

According to the present disclosure, a wheel bearing apparatus comprises an outer member inner member and double row rolling elements. The outer member outer circumference is integrally formed with a body mounting flange to be mounted on a body of a vehicle. The outer member inner circumference includes double row outer raceway surfaces. The inner member includes a wheel hub and at least one inner ring. The wheel hub is integrally formed, on its one end, with a wheel mounting flange. A cylindrical portion axially extends from the wheel mounting flange. The inner ring is press-fit onto the cylindrical portion of the wheel hub. The inner member outer circumference includes double row inner raceway surfaces that oppose the double row outer raceway surfaces. Double row rolling elements are contained between the outer raceway surfaces and inner raceway surfaces, respectively, of the outer member and the inner member. A seal is mounted in an outboard-side annular opening formed between the outer member and the inner member. A first cap is press-fit into an inboard-side opening of the outer member. An elastic member, of synthetic rubber, is integrally adhered on the outer circumference of the first cap, via vulcanized adhesion. A pulser ring is press-fit onto the outer circumference of the inner ring. The elastic member press-contacts against the outer member while being elastically deformed. The elastic member and the pulser ring are arranged at positions axially spaced apart from each other.

According to the present disclosure, a first cap (sealing cap) is press-fit into an inboard-side opening of the outer member. An elastic member, of synthetic rubber, is integrally adhered on the outer circumference of the first cap, via vulcanized adhesion. A pulser ring is press-fit onto the outer circumference of the inner ring. The elastic member press-contacts against the outer member while being elastically deformed. The elastic member and the pulser ring are arranged at positions axially spaced apart from each other. Thus, it is possible to prevent the first cap and the pulser ring from interfering with each other. Accordingly, this improves the detecting accuracy and reliability while increasing the degree of design freedom.

According to the present disclosure, the fitting portion of the cap is press-fit into the inboard-side inner circumference of the outer member. Thus, the tip end of the fitting portion is directed to the outboard side. A radially reduced portion further extends from the tip end of the fitting portion, via an inclined portion. The elastic member is adhered to the cap so that the elastic member covers the outer circumference of the inclined portion and the radially reduced portion. The elastic member extends around the tip end of the radially reduced portion. Thus, it is possible to prevent the cap and the pulser ring from interfering with each other. This eliminates the necessity to increase the outer diameter of the first cap or reducing the outer diameter of the pulser ring to avoid interference. Accordingly, the degree of design freedom can be increased. In addition, it is possible to prevent a reduction in detecting accuracy even if adopting the magnetic encoder as a pulser ring due to separation of the radially reduced portion of the first cap and the pulser ring spaced away from each other.

According to the present disclosure, the fitting portion of the cap is press-fit into the inboard-side inner circumference of the outer member. The tip end of the fitting portion is directed to the outboard side. A radially reduced portion further extends from the tip end of the fitting portion, via a bent portion bent perpendicularly to the fitting portion. The elastic member is adhered to the cap so that the elastic member covers the outer circumference of the bent portion and the radially reduced portion. The elastic member extends around the tip end of the radially reduced portion. Thus, it is possible to increase the strength and rigidity of the first cap, itself, and reduce its axial dimension.

According to the present disclosure, the inboard-side inner circumference of the outer member includes an inside fitting surface. The first cap (i.e. sealing cap) is press-fit into the inside fitting surface. A cylindrical surface, with a smaller diameter than the inside fitting surface, extends from the inside fitting surface via a step portion. The elastic member is formed with an annular projection projecting radially outward. The step portion of the outer member is formed with a tapered surface. The annular projection of the elastic member press-contacts against the tapered surface while being elastically deformed. The elastic member can be firmly pressed against the step portion of the outer member via a wedge effect. Thus, it is possible to further improve the sealability of the fitting portion.

According to the present disclosure, the elastic member press-contacts against the inside fitting surface and the step portion of the outer member. Thus, it fills an annular space formed by the inside fitting surface and the step portion. Accordingly, this increases the degree of close contact of the elastic member and thus the sealability of the fitting portion.

According to the present disclosure, the step portion of the outer member vertically extends radially inward. The elastic member press-contacts against the step portion while being elastically deformed. The elastic member abuts against the vertical step portion not against the inner cylindrical circumference of the outer member. Accordingly, this prevents the elastic member from being damaged during fitting of the first cap. Thus, it improves the reliability of the wheel bearing apparatus.

According to the present disclosure, the fitting portion of the cap is press-fit into the inboard-side inner circumference of the outer member. Thus, the tip end of the fitting portion is directed to the inboard side. The elastic member is adhered to the outer circumference of the inclined portion of the cap facing to the press-fitting direction. The side of the pulser ring and the fitting portion of the first cap are not positioned on the same plane even if the inclined portion and the pulser ring are arranged at positions axially near each other. Thus, it is possible to prevent the cap and the pulser ring from interfering with each other. This eliminates the necessity for increasing the outer diameter of the first cap or reducing the outer diameter of the pulser ring to avoid the interference. Accordingly, the degree of design freedom can be increased. In addition, this prevents a reduction in detecting accuracy even when adopting the magnetic encoder as a pulser ring due to the separation of the radially reduced portion of the first cap and the pulser ring spaced away from each other.

According to the present disclosure, the maximum value of the tolerance of the inner diameter of the inside fitting retracted surface is set larger than the inner diameter of the surface of the smaller diameter. Thus, no scratches will appear on the surface of smaller diameter of the outer member by the fitting portion of the first cap during its fitting. Thus, the elastic member will not be damaged.

According to the present disclosure, a second cap is arranged on the inboard-side of the first cap. The second cap comprises a fitting portion flange portion, bottom portion, an aperture and speed sensor. The fitting portion is press-fit into the end of the outer member. The flange portion closely contacts an inboard-side end of the outer member. The bottom portion closes the inboard-side opening of the outer member. The aperture is formed on the bottom portion at a horizontal position corresponding to the pulser ring. The rotational speed sensor is mounted in the aperture. Thus, it is possible to improve the positioning accuracy of the rotational speed sensor while increasing rigidity of the second cap (sensor cap). Also, it is possible to suppress variation of an air gap between the rotational speed sensor and the pulser ring even if the outer member and the inner member are relatively inclined due to a lateral load imparted from the wheels.

According to the present disclosure, the second cap (sensor cap) is coated by a preserving coating film with cation electro-deposition. This prevents the generation of corrosion on the fitting portion of the sensor cap for a long term. Thus, excellent sealability is obtained between the second cap and the fitting portion of the outer member.

According to the wheel bearing apparatus of the first embodiment of the present disclosure, an outer member is integrally formed with a body mounting flange on its outer circumference. The body mounting flange is mounted on a body of a vehicle. The outer member inner circumference has double row outer raceway surfaces. An inner member includes a wheel hub and at least one inner ring. The wheel hub is integrally formed, on its one end, with a wheel mounting flange. A cylindrical portion axially extends from the wheel mounting flange. The inner ring is press-fit onto the cylindrical portion of the wheel hub. The inner member outer circumference includes double row inner raceway surfaces that oppose the double row outer raceway surfaces. Double row rolling elements are contained between the outer raceway surfaces and inner raceway surfaces, respectively, of the outer member and the inner member. A seal is mounted in an outboard-side annular opening formed between the outer member and the inner member. A first cap is press-fit into an inboard-side opening of the outer member. The first cap comprises a cylindrical fitting portion, a bottom portion and an elastic member. The cylindrical fitting portion is press-fit into an inside fitting surface of the outer member. The bottom portion extends radially inward from the fitting portion to cover the inboard-side end of the inner member. The elastic member is integrally adhered on the first cap inboard-side outer circumference of the fitting portion. The elastic member is formed from synthetic rubber and secured to the first cap by vulcanized adhesion. The elastic member projects radially outward beyond the outer diameter of the fitting portion. The inner circumference of the inboard-side end of the outer member is formed with an inside fitting surface. The first cap is press-fit into the inside setting surface. A retracted surface is formed on the inboard-side from the inside fitting surface, via a step portion. The retracted surface has a larger diameter than that of the inside fitting surface. The elastic member press-contacts against the retracted surface while elastically deforming. No scratches, due to press-fitting, occur on the retracted surface where the elastic member contacts. Even if linear scratches are present on the fitting surface of the outer member, caused during insertion of the first cap (i.e. sealing cap), no damage occurs to the elastic member. Accordingly, it is possible to improve the sealability of the fitting portion of the first cap and the reliability of the wheel bearing apparatus.

According to the wheel bearing apparatus of a second embodiment of the present disclosure, an outer member is integrally formed with a body mounting flange on its outer circumference. The body mounting flange is mounted on a body of a vehicle. The outer member inner circumference has double row outer raceway surfaces. An inner member includes a wheel hub and at least one inner ring. The wheel hub is integrally formed, on its one end, with a wheel mounting flange. A cylindrical portion axially extends from the wheel mounting flange. The inner ring is press-fit onto the cylindrical portion of the wheel hub. The inner member outer circumference includes double row inner raceway surfaces that oppose the double row outer raceway surfaces. Double row rolling elements are contained between the outer raceway surfaces and inner raceway surfaces, respectively, of the outer member and the inner member. A seal is mounted in an outboard-side annular opening formed between the outer member and the inner member. A first cap is press-fit into an inboard-side opening of the outer member. An elastic member, of synthetic rubber, is integrally adhered on the outer circumference of the first cap, via vulcanized adhesion. A pulser ring is press-fit onto the outer circumference of the inner ring. The elastic member press-contacts against the outer member while elastically deforming. The elastic member and the pulser ring are arranged at positions axially spaced apart from each other. Thus, it is possible to prevent the first cap and the pulser ring from interfering with each other. This improves detecting accuracy and reliability while increasing the degree of design freedom.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a longitudinal-section view of a first embodiment of a wheel bearing apparatus.

FIG. 2 is a partially enlarged section view of a detecting portion of FIG. 1.

FIG. 3 is a partially enlarged section view of a drain portion of FIG. 1.

FIG. 4 is a partially enlarged section view of a fitting portion of a first cap of FIG. 1.

FIG. 5 is a partially enlarged section view of a modification of the wheel bearing apparatus of FIG. 1.

FIG. 6 is a partially enlarged section view of a modification of the fitting portion of the first cap of FIG. 1.

FIG. 7 is a partially enlarged section view of another modification of the fitting portion of the first cap of FIG. 1.

FIG. 8 is a partially enlarged section view of a further modification of the fitting portion of the first cap of FIG. 1.

FIG. 9 is a longitudinal-section view of a second embodiment of a wheel bearing apparatus.

FIG. 10 is a partially enlarged section view of a detecting portion of FIG. 9.

FIG. 11 is a partially enlarged section view of a fitting portion of the first cap of FIG. 9.

FIG. 12 is a partially enlarged section view of a modification of the fitting portion of the first cap of FIG. 11.

FIG. 13 is a partially enlarged section view of another modification of the fitting portion of the first cap of FIG. 11.

FIG. 14 is a partially enlarged section view of a further modification of the first cap of FIG. 11.

FIG. 15 is a partially enlarged section view of a modification of the first cap of FIG. 13.

FIG. 16 is a partially enlarged section view of a modification of the fitting portion of the first cap of FIG. 14.

FIG. 17 is a partially enlarged section view of a third embodiment of a wheel bearing apparatus.

FIG. 18 is a partially enlarged section view of a fitting portion of the first cap of FIG. 17.

FIG. 19 is a longitudinal-section view of a prior art wheel bearing apparatus.

FIG. 20 is a partially enlarged section view of a fitting portion of a cap of FIG. 19.

DETAILED DESCRIPTION

A mode for carrying out the present disclosure has a wheel bearing apparatus comprising an outer member integrally formed with a body mounting flange on its outer circumference. The body mounting flange is to be mounted on a body of a vehicle. The outer member inner circumference includes double row outer raceway surfaces. An inner member includes a wheel hub and at least one inner ring. The wheel hub is integrally formed, on its one end, with a wheel mounting flange. A cylindrical portion axially extends from the wheel mounting flange. One inner raceway surface is formed on the wheel hub opposing one of the outer raceway surfaces. The inner ring outer circumference includes the other inner raceway surface that opposes the other one of the double row outer raceway surfaces. The inner ring is press-fit onto the cylindrical portion of the wheel hub. Double row rolling elements are contained between the outer raceway surfaces and inner raceway surfaces, respectively, of the outer member and the inner member. A seal is mounted in an outboard-side annular opening formed between the outer member and the inner member. A magnetic encoder is mounted on the inner ring. A cup-shaped first cap (sealing cap) is press-fit into the inboard-side end of the outer member. A cup-shaped second cap (sensor cap) is mounted on the inboard-side of the outer member. A rotational speed sensor is mounted on the second cap at the cap's radially outer position. The rotational speed sensor and the magnetic encoder oppose each other via a predetermined axial air gap. The first cap is press-formed of non-magnetic steel sheet. The cap includes a cylindrical fitting portion press-fit into an inside fitting surface of the outer member. A disk portion extends radially inward from the fitting portion and opposes the magnetic encoder via a small axial clearance. The rotational speed sensor abuts against or closely approaches the disk portion and opposes the magnetic encoder, via the first cap. The inner circumference of the inboard-side end of the outer member has an inside fitting surface. The first cap is press-fit into the inside fitting surface. A retracted surface is formed on the inboard-side from the inside fitting surface via a step portion. The retracted surface has a larger diameter than that of the inside fitting surface. An elastic member, formed of synthetic rubber, is integrally adhered to the outer circumference of the inboard-side end of the fitting portion. The elastic member press-contacts against the retracted surface while being elastically deformed.

Preferred embodiments of the present disclosure will be described with reference to the accompanied drawings.

FIG. 1 is a longitudinal-section view of a first embodiment of a wheel bearing apparatus. FIG. 2 is a partially enlarged section view of a detecting portion of FIG. 1. FIG. 3 is a partially enlarged section view of a drain portion of FIG. 1. FIG. 4 is a partially enlarged section view of a fitting portion of a first cap of FIG. 1. FIG. 5 is a partially enlarged section view of one modification of the wheel bearing apparatus of FIG. 1. FIG. 6 is a partially enlarged section view of a modification of the fitting portion of the first cap of FIG. 1. FIG. 7 is a partially enlarged section view of another modification of the fitting portion of the first cap of FIG. 1. FIG. 8 is a partially enlarged section view of a further modification of the fitting portion of the first cap of FIG. 1. In the description below, an outer-side of the wheel bearing apparatus, when mounted on a vehicle, is referred to as the "outboard-side" (a left-side in drawings). An inner-side of the wheel bearing apparatus, when it is mounted on a vehicle, is referred to as the "inboard-side" (a right-side in drawings).

The wheel bearing apparatus of FIG. 1 is a so-called "third generation" type for a driven wheel. The wheel bearing apparatus includes an inner member 1, an outer member 2, and double row rolling elements (balls) 3, 3 contained between the inner and outer members 1 and 2. The inner member 1 includes a wheel hub 4 and an inner ring 5 press-fit onto the wheel hub 4, via a predetermined interference.

The wheel hub 4 is integrally formed, on its outboard-side end, with a wheel mounting flange 6. The wheel hub outer circumference includes one (i.e. outboard-side) inner raceway surface 4a formed on an axially extending cylindrical portion 4b. Hub bolts 6a are secured on the wheel mounting flange 6 at circumferentially equidistant positions.

The inner ring 5 is formed, on its outer circumference, with the other (i.e. inboard-side) inner raceway surface 5a. The inner ring 5 is press-fit onto the cylindrical portion 4b of the wheel hub 4 to form a double row angular contact ball bearing of back-to-back duplex type. The inner ring is axially secured on the wheel hub 4 by a caulked portion 4c. The caulking portion is formed by plastically deforming the end of the cylindrical portion 4b. This reduces both the weight and size of the wheel bearing apparatus. The inner ring 5 and balls 3, 3 are formed from high carbon chrome steel such as SUJ2. They are dip hardened to their cores to have a hardness of 58~64 HRC.

The wheel hub 4 is made of medium-high carbon steel such as S53C including carbon of 0.40~0.80% by weight. The wheel hub 4 is hardened by high frequency induction hardening to have a surface hardness of 58~64 HRC over a region from an inboard-side base 6b of the wheel mounting flange 6, forming a seal land portion described later, to the cylindrical portion 4b including the inner raceway surface 4a. The caulked portion 4c is not hardened so as to keep the surface hardness after forging. Accordingly, it is possible to have sufficient mechanical strength against rotary bending loads applied to the wheel mounting flange 6. Thus, this improves the anti-fretting property of the cylindrical portion 4c where the inner ring 5 is press-fit. Further, the bending working of the caulked portion 4c is smoothly performed without causing generation of micro cracks.

The outer member 2 is formed, on its outer circumference, with a body mount flange 2b that is mounted on a knuckle (not shown). The inboard-side of the body mounting flange includes a cylindrical pilot portion 2c to be fit into the knuckle. The outer member 2 is also formed, on its inner circumference, with double row outer raceway surfaces 2a, 2a. The outer raceway surfaces 2a, 2a oppose, respectively, the double row inner raceway surfaces 4a, 5a of the inner member 1 (i.e., wheel hub 4 and the inner ring 5). The double row rolling elements 3, 3 are contained between the outer and inner raceway surfaces 2a, 2a; 4a, 5a. The elements are rollably held by cages 7, 7. A seal 8 is mounted on the outboard-side annular opening formed by the outer member 2 and the inner member 1. A first cap 14 (i.e. sealing cap), later described more in detail, is mounted on the inboard-side annular opening. The first cap 14 and seal 8 prevent leakage of lubricating grease sealed within the bearing and entry of rain water or dust from the outside into the bearing.

Similar to the wheel hub 4, the outer member 2 is formed from medium-high carbon steel such as S53C including carbon of 0.40~0.80% by weight. At least the double row outer raceway surfaces 2a, 2a are hardened by high frequency induction hardening to have a surface hardness of 58~64 HRC.

The outboard-side seal 8 is formed as a united seal. It has a metal core 9 press-fit into the outboard-side end of the outer member 2. A sealing member 10 is adhered to the metal core 9, via vulcanized adhesion. The metal core 9 is press-formed of austenitic stainless steel sheet (JIS SUS 304 etc) or cold rolled steel sheet (JIS SPCC etc.) to have an L-shaped cross-sectional configuration.

The sealing member 10 is formed from synthetic rubber such as NBR (acrylonitrile-butadiene rubber) etc. The sealing member 10 includes a side lip 10a and a dust lip 10b. The side lip 10a and dust lip 10b extend radially outward, with inclination, and slidably contact an outer circumference of a curved base 6b, via a predetermined axial interference. A grease lip 10c extends radially inward, with inclination, and slidably contacts an outer circumference of the curved base 6b, via a predetermined axial interference. The sealing member 10 covers around the outer surface of the metal core 9 and forms a so-called half metal structure. This protects the inside of the wheel bearing apparatus while increasing the sealability.

Examples of material for the sealing member 10 are HNBR (hydrogenation acrylonitric-butadiene rubber), EPDM (ethylene propylene rubber), ACM (poly-acrylic rubber) superior in heat and chemical resistance, FKM (fluororubber) or silicone rubber other than NBR.

Although shown here with a double row angular contact ball bearing using balls as rolling elements 3, 3, the present disclosure is not limited to such a bearing and may be a double row tapered roller bearing using tapered rollers as the rolling elements 3.

A pulser ring 11 is press-fit onto the outer circumference of the inner ring 5. As shown in an enlarged view of FIG. 2, the pulser ring 11 includes an annular supporting member 12 and a magnetic encoder 13. The magnetic encoder 13 is integrally adhered to the inboard-side surface of the annular supporting member 12, via vulcanized adhesion. The magnetic encoder 13 is formed from an elastomer, such as synthetic rubber. Ferritic magnetic powder is mingled with the elastomer so that N and S poles are alternately arranged along the magnetic encoder circumference to form a rotary encoder to detect rotation of a wheel.

The annular supporting member 12 is press-formed from a steel plate such as ferritic stainless steel sheet (JIS SUS 430 etc.) or preserved cold rolled steel sheet. It has an L-shaped cross-section and includes a cylindrical portion 12a and a standing portion 12b. The cylindrical portion 12a is press-fit onto the outer circumference of the inner ring 5. The standing portion 12b extends radially outward from the cylindrical portion 12a. The magnetic encoder 13 is integrally adhered to the inboard-side surface of the standing portion 12b.

As shown in FIG. 1, the inboard-side opening of the outer member 2 is closed by a first cap (i.e. sealing cap) 14. The first cap 14 is press-fit into the inner circumference of the inboard-side end of the outer member 2. The first cap 14 has anti-corrosion property and is press-formed from a non-magnetic steel sheet such as austenitic stainless steel sheet. The first cap 14 has a cup-shape in order to prevent the detecting performance of the rotational speed sensor 22 from being adversely effected by the first cap 14. As shown in FIG. 2, the first cap 14 includes a cylindrical fitting portion 14a press-fit into the inner circumference of the inboard-side end of the outer member 2. A disk portion 14c extends radially inward from the fitting portion 14a, via a radially reduced portion 14b. The disk portion 14c opposes the magnetic encoder 13, via a small axial gap. A bottom portion 14e extends from the disk portion 14c, via a bent portion 14d, to cover the inboard-side end of the inner member 1.

In this embodiment, an elastic member 15, of synthetic rubber such as NBR, is integrally adhered, by vulcanized adhesion, to the outer circumference of the radially reduced portion 14b of the first cap 14, as shown in FIG. 2. The elastic member 15 is arranged so that it does not project toward the inboard-side from the side of the disk portion 14c so not as to interfere with the rotational speed sensor 22. An annular projection 15a projects radially outward from the outer diameter of the fitting portion 14a.

As shown in the enlarged view of FIG. 4, the inner circumference of the inboard-side end of the outer member 2 is formed with an inside fitting surface 16. The fitting portion 14a of the first cap 14 is press-fit into the inside fitting surface 16. A retracted surface 18 is formed on the inboard-side from the inside fitting surface 16 via a tapered step portion 17. The retracted surface 18 has a larger diameter than that of the inside fitting surface 16. The inside fitting surface 16 of the outer member 2 is formed so that the amplitude of chatter vibration in machining is limited to 3 µm or less. The annular projection 15a of the elastic member 15 press-contacts against the retracted surface 18 while elastically deforming to improve the sealability of the fitting portion 14a.

According to this embodiment, the inner circumference of the inboard-side end of the outer member 2 is formed with the inside fitting surface 16 and a retracted surface 18. The retracted surface 18 is formed on the inboard-side from the inside fitting surface 16 via a step portion 17. The fitting portion 14a of the first cap 14 is press-fit into the inside fitting surface 16. The elastic member 15 press-contacts against the retracted surface 18. The retracted surface 18 has a diameter larger than that of the fitting surface 16. Thus, no scratches due to press-fitting of the first cap 14 are formed on the retracted surface 18 where the elastic member contacts the outer member 2. Even if linear scratches occur on the fitting surface 16 of the outer member 2 during insertion of the first cap 14, damage to the annular projection 15a is prevented. Accordingly, it is possible to improve the sealability of the fitting portion 14a of the first cap 14 and the reliability of the wheel bearing apparatus.

The inner diameter (Dr) of the retracted surface 18 of the outer member 2 is set larger than the maximum value of the tolerance of the inner diameter (Ds) of the inside fitting surface 16 of the outer member 2. This prevents scratches from occurring during fitting of the first cap (sealing cap) 14 on the retracted surface 18 where the elastic member 15 contacts.

According to this embodiment, a second cap (i.e. sensor cap) 19 is further arranged on the inboard-side of the first cap 14, as shown in FIG. 2. An outside fitting surface 20 of the outer member 2 is formed on an opening-side (inboard-side) of the retracted surface 18, via a predetermined step. The second cap (i.e. sensor cap) 19 is press-fit into the outside fitting surface 20, via a predetermined interference. This minimizes the press-fitting stroke of the first cap 14. Thus, this improves workability of the assembly. The outside fitting surface 20 is ground, by a formed grinding wheel, simultaneously with the double row outer raceway surfaces 2a, 2a and the inside fitting surface 16, where the first cap 14 is press-fit. This improves the accuracy in the roundness and coaxialness of the fitting surfaces 16, 20. Thus, this improves the sealability of the fitting portions. In addition, the simultaneous grinding reduces the working steps and therefore reduces manufacturing costs.

The second cap (sensor cap) 19 is formed from preserved and cold-rolled steel sheet with a cup-shape. A cylindrical fitting portion 19a is inserted into the outside fitting surface 20 of the outer member 2. A flange portion 19b, formed as a double bent portion, extends radially outward from the fitting portion 19a. The flange portion 19b is adapted to be in close contact against the inboard-side end face 2d of the outer member 2. A bottom portion 19c extends radially inward from the flange portion 19b. The bottom portion 19c closes an inboard-side opening of the outer member 2. An insert aperture 21 is formed in the bottom portion 19c of the sensor cap 19 at a horizontal position corresponding to the magnetic encoder 13. The rotational speed sensor 22 is inserted and mounted into the aperture 21.

The second cap (sensor cap) 19 is formed with the flange portion 19b in close contact with the end face 2d of the outer member 2. Thus, it is possible to increase the rigidity of the second cap 19. This improves the positioning accuracy of the rotational speed sensor 22 and also suppresses variation of air gap between the rotational speed sensor 22 and the magnetic encoder 13 even if the outer member 2 and the inner member 1 would become relatively inclined to one another by a lateral load imparted from the wheels.

A securing nut 24 is secured in an aperture 23, formed on the second cap 19, by caulking at the center of the second cap 19 and at an outboard-side of its bottom portion 19c. The securing nut 24 may be secured on the second cap 19 e.g. by welding, adhesion or press-fitting other than by caulking. The rotational speed sensor 22 is mounted in the aperture 21 of the second cap 19. The speed sensor 22 can be secured on the second cap 19 by fastening a mounting bolt 26 into the nut 24, via a mounting member 25. Since the securing nut 24 is pulled into the outboard-side surface of the bottom portion 19c, by simply fastening the mounting bolt 26, the rotational speed sensor 22 can be firmly secured onto the second cap 19 only by caulking of the securing nut 24.

The rotational speed sensor 22 includes an IC incorporated with a magnetic detecting element such as a Hall element, a magnetic resistance elements (MR elements) etc. for varying characteristics in accordance with flow of magnetic fluxes. A waveform shaping circuit shapes output waveforms and forms part of the anti-lock brake system (ABS) of an automobile to detect and control the rotational speed of the wheels. The rotational speed sensor 22 is inserted until the tip of the sensor 22 abuts against or is in close contact with the disk portion 14c of the first cap 14. This provides a wheel bearing apparatus that can obtain a desirable air gap. This improves the assembling workability while eliminating complicated air-gap adjustment. It seals the inside of the wheel bearing apparatus with the first cap 14 and the elastic member 15 on the radially reduced portion 14b.

The second cap 19 is formed from preserving film by performing coating with a cation electro-deposition coating. Although the cation electro-deposition coating is performed by connecting articles to a negative electrode, anion electro-deposition coating, where articles are connected to a positive electrode, may be used. The anion electro-deposition coating is characterized in that colors of the coating are stable and the deposition temperature can be set low. However, the cation electro-deposition coating with epoxy resin is more preferable in coating the second cap 19 due to its superiorities in anti-preserving power and adhesion power of the coating.

According to this embodiment, the second cap (sensor cap) 19 is formed with a preserving film from the cation electro-deposition coating. This prevents the generation of corrosion on the fitting portion 19a of the second cap 19 for a long term. Thus, excellent sealability is obtained between the outside fitting surface 20 and the end face 2d of the outer member 2.

In the half-metal structure of seal 8, previously described where the sealing member 10 covers the fitting portion of the metal core 9, it may be possible to provide a fitting portion on the outboard-side inner circumference of the outer member 2 and a retracted surface from the fitting portion via a step portion so as to press-contact a portion of the sealing member 10 against the retracted surface.

Further according to this embodiment, a drain 27 is formed on the bottom portion 19c of a bulged portion 28 of the second cap (sensor cap) 19 in a region near the ground, as shown in FIG. 3. The bulged portion 28 projects toward the inboard-side from the bottom portion 19c by a predetermined distance L. The bulged portion 28 is effective when the knuckle K projects toward the inboard-side from the end face 2d of the outer member 2, as shown in FIG. 3. Accordingly, it is possible to effectively discharge foreign matter outside without being disturbed by the knuckle K of a vehicle.

In this embodiment, although it has been described as a so-called double cap structure where the second cap (i.e. sensor cap) 19 is arranged at inboard-side of the first cap (i.e. sealing cap) 14, the present disclosure is not limited to the double cap structure. It may be possible to adopt a single cap structure where only the sealing cap is fit into the inner circumference of the outer member. That is, as shown in a modification of FIG. 5, the outer member 2' is formed on its inner circumference with a fitting surface 16' that receives the press-fit fitting portion 14a of the cap 14. A retracted surface 18' extends from the fitting surface 16' toward the inboard-side via a tapered step portion 17'. The retracted surface 18' has a diameter larger than that of the fitting surface 16'. The annular projection 15a of the elastic member 15 is elastically deformed and press-contacts against the retracted surface 18' of the outer member 2' when the cap 14 is press-fit into the fitting surface 16' of the outer member 2'.

As previously described, it is also possible in this modification to provide a wheel bearing apparatus where no scratches occur on the retracted surface 18' of the outer member 2' during press-fitting of the cap 14. Also, damage to the annular projection 15a is prevented. Thus, this improves the sealability of the fitting portion 14a of the cap 14 and the reliability of the wheel bearing apparatus.

FIG. 6 illustrates a modification of first cap (sealing cap). This first cap 29 has anti-corrosion property and is press-formed from non-magnetic steel sheet such as austenitic stainless steel sheet. The first cap 29 has a cup-shape to prevent adversely detecting performance of the rotational speed sensor 22. The first cap 29 includes a cylindrical fitting portion 29a and a disk portion 29b. The cylindrical fitting portion 29a is press-fit into the inner circumference of the inboard-side end of the outer member 31. The disk portion 29b extends radially inward from the fitting portion 29a and opposes the magnetic encoder 13, via a small axial gap.

Similar to the first embodiment, an elastic member 30, of synthetic rubber such as NBR, is integrally adhered, by vulcanized adhesion, to the outer circumference of the fitting portion 29a of the first cap 29, as shown in FIG. 6. The elastic member 30 is arranged so that it does not project toward the inboard-side from the side of the disk portion 29b so not as to interfere with the rotational speed sensor 22. The elastic member 30 has a tapered annular projection 30a projecting radially outward from the outer diameter of the fitting portion 29a.

The inner circumference of the inboard-side end of the outer member 31 is formed with an inside fitting surface 16. The fitting portion 29a of the first cap 29 is press-fit into the fitting surface 16. A tapered retracted surface 32 gradually extends from the inside fitting surface 16 toward the opening of the outer member 31, via a tapered step portion 17. The annular projection 30a of the elastic member 30 elastically deforms when it press-contacts against the retracted surface 32 of the outer member 31 when the first cap 29 is press-fit into the fitting surface 16 of the outer member 31. In this embodiment, the elastic member 30 can be firmly pressed against the tapered surface of the outer member 31 via a wedge effect between the tapered surfaces of the annular projection 30a and the retracted surface 32 of the outer member 31. Thus, this further improves the sealability of the fitting portion 29a.

FIG. 7 shows another modification of the first cap (i.e. sealing cap) 29. An elastic member 33 has a different structure from that of the elastic member 30 of FIG. 6. This first cap 29 has the cylindrical fitting portion 29a that is press-fit into the inner circumference of the inboard-side end of the outer member 2. The disk portion 29b extends radially inward from the fitting portion 29a and opposes the magnetic encoder 13, via a small axial gap. The elastic member 33, of synthetic rubber such as NBR, is also integrally adhered, by vulcanized adhesion, to the outer circumference of the fitting portion 29a of the first cap 29.

The elastic member 33 is adhered to the first cap 29 so that it does not project toward the inboard-side from the side of the disk portion 29b so not as to interfere with the rotational speed sensor 22. The elastic member 33 elastically deforms and press-contacts against the retracted surface 18 of the outer member 2 when the first cap 29 is press-fit into the fitting portion 16 of the outer member 2. According to this modification, the whole outer circumference, not the annular projection, of the elastic member 33 press-contacts against the retracted surface 18 of the outer member 2. Thus, it is possible to further improve the sealability of the fitting portion 29a.

FIG. 8 shows a further modification of the fitting portion of the first cap 29. An elastic member 34 has a different structure from those of the elastic members 30, 33 of FIGS. 6 and 7. This first cap 29 has the cylindrical fitting portion 29a to be press-fit into the inner circumference of the inboard-side end of the outer member 2. The disk portion 29b extends radially inward from the fitting portion 29a and opposes the magnetic encoder 13, via a small axial gap. The elastic member 34, of synthetic rubber such as NBR, is also integrally adhered, by vulcanized adhesion, to the outer circumference of the fitting portion 29a of the first cap 29.

The elastic member 34 is adhered to the first cap 29 so that it does not project toward the inboard-side from the side of the disk portion 29b so not as to interfere with the rotational speed sensor 22. The elastic member 34 elastically deforms and press-contacts against both the step portion 17 and the retracted surface 18 of the outer member 2 when the first cap 29 is press-fit into the fitting portion 16 of the outer member 2. According to this modification, the elastic member 34 can fill a space between the outer member 2 and the first cap 29. Thus, it is possible to further improve the sealability of the fitting portion 29a.

FIG. 9 is a longitudinal-section view of a second embodiment of a wheel bearing apparatus. FIG. 10 is a partially enlarged section view of a detecting portion of FIG. 9. FIG. 11 is a partially enlarged section view of a fitting portion of the first cap of FIG. 9. FIG. 12 is a partially enlarged section view of a modification of the fitting portion of the first cap of FIG. 11. FIG. 13 is a partially enlarged section view of another modification of the fitting portion of the first cap of FIG. 11. FIG. 14 is a partially enlarged section view of a further modification of the first cap of FIG. 11. FIG. 15 is a partially enlarged section view of a modification of the first cap of FIG. 13. FIG. 16 is a partially enlarged section view of a modification of the fitting portion of the first cap of FIG. 14. This second embodiment is basically same as the first embodiment. It differs in the configurations of the fitting surface of the outer member 2 and the first cap 14. Accordingly, the same reference numerals that are used in this embodiment designate the same structural elements as those used in the previous embodiment.

The wheel bearing apparatus of FIG. 9 is a so-called "third generation" type for a driven wheel. It includes an inner member 1, an outer member 35, and double row rolling elements (balls) 3, 3 contained between the inner and outer members 1 and 35.

The outer member 35 is formed, on its outer circumference, with body mount flange 2b to be mounted on a knuckle (not shown). The outer member inboard-side of the body mounting flange includes a cylindrical pilot portion 2c to be fit into the knuckle. The outer member 35 is also formed, on its inner circumference, with double row outer raceway surfaces 2a, 2a that oppose, respectively, the double row inner raceway surfaces 4a, 5a of the inner member 1. The double row rolling elements 3, 3 are contained between the outer and inner double row outer raceway surfaces 2a, 2a; 4a, 5a. They are rollably held therein by cages 7, 7. A seal 8 is mounted on the outboard-side annular opening formed by the outer member 35 and the inner member 1. A first cap (i.e. sealing cap) 36, later described in more detail, is mounted on the inboard-side opening to prevent leakage of lubricating grease sealed within the bearing and entry of rain water or dust from outside into the bearing.

Similar to the wheel hub 4, the outer member 35 is formed of medium-high carbon steel such as S53C including carbon of 0.40~0.80% by weight. At least the double row outer raceway surfaces 2a, 2a are hardened by high frequency induction hardening to have a surface hardness of 58~64 HRC.

The first cap 36 has anti-corrosion property and is press-formed from non-magnetic steel sheet such as austenitic stainless steel sheet. The cap 36 has a cup-shape in order to prevent adverse detecting performance of the rotational speed sensor 22. The first cap 36 comprises a cylindrical fitting portion 36a, a radially reduced portion 36c, an inclined portion 36b, a disk portion 36d, a bent portion 36e, and a bottom portion 36f. The cylindrical fitting portion 36a is press-fit into the inner circumference of the inboard-side end of the outer member 35. The radially reduced portion 36c is formed at the outboard-side end of the fitting portion 36a, via the inclined portion 36b. The disk portion 36d extends radially inward from the inboard-side end of the fitting portion 36a and opposes the magnetic encoder 13 via a small axial gap. The bottom portion 36f extends from the disk portion 36d, via the bent portion 36e, and covers the inboard-side end of the inner member 1.

As shown in the enlarged view of FIG. 11, the elastic member 37, of synthetic rubber such as NBR, is integrally adhered, by vulcanized adhesion, to the outer circumference region over part of the inclined portion 36b and the radially reduced portion 36c of the first cap 36. Thus, the elastic member 37 covers the outer circumference of part of the inclined portion 36b and the radially reduced portion 36c and extends around the tip end of the radially reduced portion 36c. The elastic member 37 is integrally formed with an annular projection 37a that projects radially outward.

The inner circumference of the inboard-side end of the outer member 35 is formed with an inside fitting surface 38. The fitting portion 36a of the first cap 36 is press-fit into the inside fitting surface 38. A cylindrical surface 40, with a smaller diameter than the fitting surface 38, is formed on the outboard-side from the fitting surface 38, via a tapered step portion 39. The annular projection 37a of the elastic member 37 elastically deforms and press-contacts against the cylindrical surface 40 of smaller diameter of the outer member 35.

The elastic member 37 is adhered to the inclined portion 36b and the radially reduced portion 36c, positioned on the outboard-side (press-fitting direction), of the first cap 36 and axially spaced apart from the magnetic encoder 13. Thus, it is possible to prevent the first cap 36 and the magnetic encoder 13 from interfering with each other. Accordingly, it is unnecessary to increase the outer diameter of the first cap 36 or to reduce the outer diameter of the annulus supporting member 12. This improves the degree of design freedom of the wheel bearing apparatus. In addition, the magnetic encoder 13 is spaced apart from the radially reduced portion 36c of the first cap 36. This prevents a reduction of detecting accuracy of the magnetic encoder 13 even if the radially reduced portion 36c would be magnetized by component variation caused by bending work during manufacture of the first cap 36.

The inner diameter (Ds1) of the inside fitting surface 38 of the outer member 35 is set larger than inner diameter (Dr1) of the smaller diameter surface 40. More particularly, the maximum value of the tolerance of the inner diameter (i.e. minimum inner diameter) (Ds1) of the retracted inside fitting surface 38 is set larger than the inner diameter (Dr1) of the surface of the smaller diameter 40. Accordingly, a relation of Dr1≤Ds1 can be assured even if dimensional variations of the inner diameter occur by turning work on the inside fitting surface 38. Thus, a difference in diameters between the fitting surface 36a of the first cap 36 and the press-fitting surface of the elastic member 37 can be generated. This prevents the annular projection 37a of the elastic member 37 from being partially damaged by contact against the inside fitting surface 38. Thus, this improves the quality and reliability of the wheel bearing apparatus.

Also in this embodiment, a second cap (i.e. sensor cap) 19 is further arranged on the inboard-side of the first cap 36, as shown in FIG. 10. The outside fitting surface 20 of the outer member 35 is formed on an opening-side (inboard-side), via a predetermined step. The second cap (i.e. sensor cap) 19 is press-fit into the outside fitting surface 20, via a predetermined interference.

The second cap (sensor cap) 19 is press-formed of preserved and cold-rolled steel sheet. The second cap 19 has a cup-shape and includes a cylindrical fitting portion 19a, a flange portion 19b, and a bottom portion 19c. The cylindrical fitting portion is inserted into the inner circumference of the inboard side end of the outer member 35. The flange portion 19b, formed as a double bent portion, extends radially outward from the fitting portion 19a. The flange portion 19b is adapted to be in close contact against the inboard-side end face 2d of the outer member 35. The bottom portion 19c extends radially inward from the flange portion 19b, via a cylindrical portion, to close an inboard-side opening of the outer member 35. An insert aperture 21 is formed in the bottom portion 19c of the sensor cap 19 at a horizontal position corresponding to the magnetic encoder 13. The rotational speed sensor 22 is inserted and mounted in the aperture 21.

The second cap (sensor cap) 19 is formed with the flange portion 19b in close contact with the end face 2d of the outer member 35. Thus, it is possible to increase the rigidity of the second cap 19. This improves the positioning accuracy of the rotational speed sensor 22 and also suppresses the variation of the air gap between the rotational speed sensor 22 and the magnetic encoder 13 even if the outer member 35 and the inner member 1 would be relatively inclined by a lateral load imparted from the wheels.

FIG. 12 shows a modification of FIG. 11. In this modification, the inner circumference of the end of the outer member 35' is formed by the inside fitting surface 38. The fitting portion 36a of the first cap 36 is press-fit into the inside fitting surface 38. Thus, the annular projection 37a of the elastic member 37 elastically deforms and press-contacts against the inside fitting surface 38 of the outer member 35' when the first cap 36 is press-fit into the outer member 35'.

According to this modification, the configuration of the inner circumference of the outer member 35' is simplified to reduce manufacturing cost and attain easier manufacturing workability. In addition, similar to the previous embodiment, the magnetic encoder 13 is positioned spaced apart from the radially reduced portion 36c of the first cap 36. Thus, it is possible to prevent the magnetic encoder 13 from being interfered with by the first cap 36. Also, it prevents a reduction of detecting accuracy of the magnetic encoder 13 even if the radially reduced portion 36c would be magnetized by component variation caused by bending work during manufacture of the first cap 36.

FIG. 13 shows a modification of the previous first cap 36 (FIG. 11). This first cap 41 has anti-corrosion property and is press-formed from non-magnetic steel sheet such as austenitic stainless steel sheet. The first cap 41 has a cup-shape in order to prevent adverse detecting performance of the rotational speed sensor 22. The first cap 41 has a cylindrical fitting portion 36a press-fit into the inside fitting surface 38 of an outer member 42. A radially reduced portion 36c is formed at an outboard-side end of the fitting portion 36a, via an inclined portion 36b. A disk portion 36d extends radially inward from an inboard-side end of the fitting portion 36a. The disk portion 36d opposes the magnetic encoder 13 via a small axial gap.

Also in this modification, an elastic member 43, of synthetic rubber such as NBR, is integrally adhered, by vulcanized adhesion, to the outer circumferences of the inclined portion 36b and the radially reduced portion 36c of the first cap 41. The elastic member 43 covers the outer circumference of part of the inclined portion 36b and the radially reduced portion 36c. The elastic member 43 extends around the tip end of the radially reduced portion 36c. The elastic member 43 is integrally formed with an annular projection 43a. The annular projection 43a projects radially outward and has a tapered surface.

The inner circumference of the inboard-side end of the outer member 42 is formed with the inside fitting surface 38. The fitting portion 36a of the first cap 41 is press-fit into the fitting surface 38. A step portion 44 tapers toward the outboard-side from the inside fitting surface 38. According to this modification, the annular projection 43a, with the tapered surface of the elastic member 43, elastically deforms and press-contacts against the tapered step portion 44. The elastic member 43 can be firmly pressed against the step portion 44 of the outer member 42, via a wedge effect. Thus, it is possible to further improve the sealability of the fitting portion 36a.

FIG. 14 shows another modification of the previous first cap 36 (FIG. 11) with partially different configurations. This first cap 45 is press-formed from non-magnetic steel sheet such as austenitic stainless steel sheet. The first cap 45 has a cup-shape. The first cap 45 has a cylindrical fitting portion 36a press-fit into the inside fitting surface 38 of an outer member 35. A radially reduced portion 36c is formed at an outboard-side end of the fitting portion 36a, via a bent portion 45a. A disk portion 36d extends radially inward from an inboard-side end of the fitting portion 36a. The disk portion opposes the magnetic encoder 13 via a small axial gap.

According to this modification, the elastic member 37 elastically deforms and press-contacts against the radially reduced surface 40 of the outer member 35 when the first cap 45 is press-fit into the outer member 35. The radially reduced portion 36c is formed via the vertically bent portion 45a. Thus, this increases the strength and rigidity of the first cap 45, itself, and reduces an axial size of the first cap 45.

FIG. 15 shows another modification of the previous first cap 41 (FIG. 13) with partially different configurations in the cap 41 and the elastic member 43. This first cap 46 is press-formed from non-magnetic steel sheet such as austenitic stainless steel. The first cap 46 has a cup-shape. The first cap 41 has a cylindrical fitting portion 36a press-fit into the inside fitting surface 38 of an outer member 42. A radially reduced portion 36c is formed at an outboard-side end of the fitting portion 36a, via a bent portion 45a. A disk portion 36d extends radially inward from an inboard-side end of the fitting portion 36a. The disk portion 36d opposes the magnetic encoder 13, via a small axial gap.

Also in this modification, an elastic member 47, of synthetic rubber such as NBR, is integrally adhered, by vulcanized adhesion, to the outer circumferences of the bent portion 45a and the radially reduced portion 36c of the first cap 46. The elastic member 47 covers the outer circumference of part of the bent portion 45a and the radially reduced portion 36c. The elastic member 47 extends around the tip end of the radially reduced portion 36c. The elastic member 47 is formed from synthetic rubber, such as NBR etc. The elastic member 47 is integrally formed with an annular projection 47a. The projection 41 projects radially outward and has a tapered surface. The elastic member 47 elastically deforms and press-contacts against the step portion 44. According to this modification, the radially reduced portion 36c is formed via the vertically bent portion 45a. Thus, it is possible to increase the strength and rigidity of the first cap 46, itself, and reduce an axial size of the first cap 46. In addition, the elastic member 47 fills an annular space formed by the inside fitting portion 38 of the outer member 42 and the tapered step portion 44. Thus, it is possible to further increase the degree of close contact of the elastic member 47 and accordingly the sealability of the fitting portion 36a.

FIG. 16 shows a modification of the previous first cap 45 (FIG. 14) with partially different configurations of the inner circumference of the end of the outer member 35. The inner circumference of the end of the outer member 48 is formed with the inside fitting surface 38. The fitting portion 36a of the first cap 45 is press-fit into the fitting surface 38. A step portion 49 vertically extends radially inward from the inside fitting surface 38 via a scooped out portion 48a. According to this modification, the annular projection 37a of the elastic member 37 elastically deforms and press-contacts against the step portion 49 of the outer member 48 when the first cap 45 is press-fit into the outer member 48. In addition, the annular projection 37a of the elastic member 37 axially abuts against the vertically extending step 49 and not against the inner circumference of the outer member 48. Thus, it is possible to prevent the elastic member 37 from being damaged. Accordingly, this improves the sealability and reliability.

FIG. 17 is a longitudinal-section view of a third embodiment of a wheel bearing apparatus. FIG. 18 is a partially enlarged section view of a fitting portion of the first cap of FIG. 17. The third embodiment is basically same as the second embodiment (FIG. 10) except in configurations of the first cap (sealing cap) 36 and the second cap (sensor cap) 19 and the press-fitting form. Accordingly, the same reference numerals are used in this embodiment to designate the same structural elements as those used in the previous embodiment.

In the third embodiment, an outer member 50 has, on its outer circumference, an integrally formed body mounting flange 2b. A cylindrical pilot portion 50a is on an inboard-side of the body mounting flange 2b. The pilot portion 50a is adapted to be fit into a knuckle (not shown). A first cap (sealing cap) 51 seals the inboard-side opening of the outer member 50. The first cap 51 is press-fit into the outer member 50. A second cap (sensor cap) 52 is press-fit onto the outer member 50 at the inboard-side of the first cap 51.

The first cap 51 has anti-corrosion property and is press-formed from non-magnetic steel sheet such as austenitic stainless steel sheet. The first cap 51 has a cup-shape to prevent adverse detecting performance of the rotational speed sensor 22. As shown in FIG. 17, the first cap 51 has a cylindrical fitting portion 51a press-fit into the inner circumference of the inboard-side end of the outer member 50. A disk portion 51c extends radially inward from the outboard-side end of the fitting portion 51a, via an inclined portion 51b. The disk portion 51c opposes the magnetic encoder 13 via a small axial gap to close the inboard-side end of the outer member 50. The elastic member 53, of synthetic rubber such as NBR, is integrally adhered, by vulcanized adhesion, to the outer circumference of the inclined portion 51b of the first cap 51. The elastic member 53 is integrally formed with an annular projection 53a that projects radially outward.

The second cap (sensor cap) 52 is press-formed from preserved and cold-rolled steel sheet. The second cap 52 has a cup-shape. The second cap 52 has a cylindrical fitting portion 52a that inserts onto the outer circumference of the inboard-side end of the pilot portion 50a. A flange portion 52b extends from the fitting portion 52a. The flange portion 52b is adapted to be in close contact against the inboard-side end face 2d of the outer member 50. A bottom portion 52d extends radially inward from the flange portion 52b, via a cylindrical portion 52c, to close an inboard-side opening of the outer member 50. An insert aperture 21 is formed in the bottom portion 52d of the sensor cap 52 at a horizontal position corresponding to the magnetic encoder 13. The rotational speed sensor 22 is inserted and mounted in the aperture 21.

As shown in the enlarged section view of FIG. 18, the inner circumference of the inboard-side end of the outer member 50 is formed with an inside fitting surface 54. The fitting portion 51a of the first cap 51 is press-fit into the fitting surface 54. A radially reduced inboard cylindrical surface 56 has a smaller diameter than the inside fitting surface 54, via a step 55. The annular projection 53a of the elastic member 53 elastically deforms and press-contacts against the inside fitting surface 54 when the first cap 51 is press-fit into the outer member 50. The annular projection 53*a* of the elastic member 53 may press-contact against the radially reduced surface 56 not against the inside fitting surface 54. This makes it possible to prevent the annular projection 53*a* from being partially damaged by linear scratches caused on the inside fitting surface 54 when the first cap 51 is press-fit into the outer member 50.

According to the third embodiment, the first cap 51 is press-fit into the outer member 50. Thus, the opening of the cap 51 is directed to the inboard side. The elastic member 53 is adhered to the outer circumference of the inclined portion 51*b* of the cap 51 facing to the press-fitting direction. The side of the magnetic encoder 13 and the fitting portion 51*a* of the cap 51 are not positioned on the same plane even if the inclined portion 51*b* and the magnetic encoder 13 are arranged at axially positions near each other. Thus, it is possible to prevent the cap 51 and the magnetic encoder 13 from interfering with each other. This eliminates the need to increase the outer diameter of the cap 51 or reduce the outer diameter of the supporting annulus 12 to avoid interference between them. Accordingly, the degree of design freedom can be increased.

The present disclosure can be applied to any wheel bearing apparatus of the inner ring rotation type for a driven wheel type where any rolling elements, such as balls or tapered rollers, are used and the first cap is mounted on the inboard-side end of the outer member.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A wheel bearing apparatus comprising:
   an outer member integrally formed with a body mounting flange on its outer circumference, the body mounting flange is to be mounted on a body of a vehicle, the outer member inner circumference including double row outer raceway surfaces;
   an inner member including a wheel hub and at least one inner ring, the wheel hub is integrally formed, on its one end, with a wheel mounting flange, a cylindrical portion axially extends from the wheel mounting flange, the inner ring is press-fit onto the cylindrical portion of the wheel hub, the inner member outer circumference includes double row inner raceway surfaces opposing the double row outer raceway surfaces;
   double row rolling elements are contained between the outer raceway surfaces and inner raceway surfaces, respectively, of the outer member and the inner member;
   a seal mounted is on an outboard-side annular opening formed between the outer member and the inner member; and
   a first cap press-fit into an inboard-side opening of the outer member, the first cap comprising a cylindrical fitting portion press-fit into an inside fitting surface of the outer member, a bottom portion extending radially inward from the fitting portion to cover the inboard-side end of the inner member, an elastic member is integrally adhered to an inboard-side outer circumference of the fitting portion of the first cap, the elastic member is formed from synthetic rubber and vulcanized adhered to the first cap, the elastic member projecting radially outward beyond the outer diameter of the fitting portion;
   the inner circumference of the inboard-side end of the outer member has inside fitting surface, the first cap is press-fit into the inside fitting surface, a retracted surface is formed on an inboard-side from the inside fitting surface, via a step portion;
   the elastic member press-contacts against the retracted surface while being elastically deformed; and
   the retracted surface of the outer member is formed with a tapered step portion extending toward the open end and the elastic member has a tapered surface press-contacted against the tapered step portion.

2. The wheel bearing apparatus of claim 1, wherein the inner diameter (Dr) of the retracted surface is set larger than the maximum value of the tolerance of the inner diameter (Ds) of the inside fitting surface.

3. The wheel bearing apparatus of claim 1, wherein the elastic member press-contacts against both the step portion and retracted surface of the outer member.

4. The wheel bearing apparatus of claim 1, wherein a pulser ring, with circumferentially and equidistantly varying magnetic characteristics, is press-fit onto the inner ring, the first cap is formed of non-magnetic steel sheet, and a rotational speed sensor opposes the pulser ring via a predetermined axial air gap through the first cap, the rotational speed sensor abuts against or is arranged close to the first cap.

5. The wheel bearing apparatus of claim 1, wherein a second cap is arranged on the inboard-side of the first cap, the second cap comprises a fitting portion to be press-fit into the end of the outer member, a flange portion is in contact with an inboard-side end of the outer member and a bottom portion for closing the inboard-side opening of the outer member, an aperture is formed on the bottom portion at a horizontal position corresponding to the pulser ring, and a rotational speed sensor is mounted in the aperture.

6. The wheel bearing apparatus of claim 5, wherein the second cap is coated by a preserving coating film comprising cation electro-deposition.

7. A wheel bearing apparatus comprising:
   an outer member is integrally formed with a body mounting flange on its outer circumference, the body mounting flange is to be mounted on a body of a vehicle, the outer member inner circumference includes double row outer raceway surfaces;
   an inner member includes a wheel hub and at least one inner ring, the wheel hub is integrally formed, on its one end, with a wheel mounting flange, a cylindrical portion axially extends from the wheel mounting flange, the inner ring is press-fit onto the cylindrical portion of the wheel hub, the inner member outer circumference includes double row inner raceway surfaces opposing the double row outer raceway surfaces; and
   double row rolling elements are contained between the outer raceway surfaces and inner raceway surfaces, respectively, of the outer member and the inner member;
   a seal is mounted on an outboard-side annular opening formed between the outer member and the inner member;
   a first cap is press-fit into an inboard-side opening of the outer member, a retracted surface is formed on an inboard-side of the outer member; an elastic member, of synthetic rubber, is integrally adhered on the outer circumference of the first cap via vulcanized adhesion;

a pulser ring is press-fit onto the outer circumference of the inner ring;

the elastic member press-contacts against the retracted surface of outer member while being elastically deformed; and the retracted surface of the outer member is formed as a tapered surface extending toward the open end and the elastic member has a tapered surface press-contacted against the tapered retracted surface;

the elastic member and the pulser ring are arranged at positions axially spaced apart from each other.

8. The wheel bearing apparatus of claim 7, wherein a fitting portion of the cap is press-fit into an inboard-side inner circumference of the outer member, a tip end of the fitting portion is directed to the outboard side, a radially reduced portion further extended from the tip end of the fitting portion via an inclined portion, and the elastic member is adhered to the cap so that the elastic member covers the outer circumference of the inclined portion and the radially reduced portion, and the elastic member extends around the tip end of the radially reduced portion.

9. The wheel bearing apparatus of claim 7, wherein a fitting portion of the cap is press-fit into the inboard-side inner circumference of the outer member so that a tip end of the fitting portion is directed to the outboard side, a radially reduced portion further extends from the tip end of the fitting portion via a bent portion bent perpendicularly to the fitting portion, and the elastic member is adhered to the cap so that the elastic member covers the outer circumference of the bent portion and the radially reduced portion and the elastic member extends around the tip end of the radially reduced portion.

10. The wheel bearing apparatus of claim 7, wherein an inboard-side inner circumference of the outer member comprises an inside fitting surface, the first cap is press-fit into the inside fitting surface, a cylindrical surface of a smaller diameter than the inside fitting surface extends from the inside fitting surface via a step portion, the elastic member is formed with an annular projection projecting radially outward, and the step portion of the outer member is formed by the tapered surface, the annular projection of the elastic member press-contacts while being elastically deformed with the tapered surface.

11. The wheel bearing apparatus of claim 10, wherein the elastic member press-contacts against the inside fitting surface and the step portion of the outer member so that the elastic member fills an annular space formed by the inside fitting surface and the step portion.

12. The wheel bearing apparatus of claim 10, wherein a maximum value of the tolerance of an inner diameter ($Ds1$) of an inside retracted fitting surface is set larger than an inner diameter ($Dr1$) of the surface of the smaller diameter.

13. The wheel bearing apparatus of claim 7, wherein a step portion of the outer member vertically extends radially inward and the elastic member press-contacts against a step portion while being elastically deformed.

14. The wheel bearing apparatus of claim 7, wherein the fitting portion of the cap is press-fit into the inboard-side inner circumference of the outer member so that a tip end of the fitting portion is directed to the inboard side, and the elastic member is adhered to the outer circumference of an inclined portion of the cap facing to the press-fitting direction.

15. The wheel bearing apparatus of claim 7, wherein a second cap is arranged on the inboard-side of the first cap, the second cap comprises a fitting portion to be press-fit into the end of the outer member, a flange portion to be in close contact with an inboard-side end of the outer member and a bottom portion for closing the inboard-side opening of the outer member, an aperture is formed on the bottom portion at a horizontal position corresponding to the pulser ring, and a rotational speed sensor is mounted in the aperture.

16. The wheel bearing apparatus of claim 15, wherein the second cap is coated by a preserving coating film comprising cation electro-deposition.

* * * * *